(12) United States Patent
Pande et al.

(10) Patent No.: US 6,519,466 B2
(45) Date of Patent: Feb. 11, 2003

(54) MULTI-MODE GLOBAL POSITIONING SYSTEM FOR USE WITH WIRELESS NETWORKS

(75) Inventors: Ashutosh Pande, Milpitas, CA (US); Lionel Jacques Garin, Palo Alto, CA (US); Kanwar Chadha, Los Gatos, CA (US); Gregory Bret Turetzky, San Jose, CA (US)

(73) Assignee: Sirf Technology, Inc., San Jose, CA (US)

( * ) Notice: Subject to any disclaimer, the term of this patent is extended or adjusted under 35 U.S.C. 154(b) by 0 days.

(21) Appl. No.: 10/068,751

(22) Filed: Feb. 5, 2002

(65) Prior Publication Data

US 2002/0086684 A1 Jul. 4, 2002

Related U.S. Application Data

(63) Continuation of application No. 09/781,068, filed on Feb. 8, 2001, now Pat. No. 6,389,291.
(60) Provisional application No. 60/225,076, filed on Aug. 14, 2000.

(51) Int. Cl.[7] ................................................. H04Q 7/20
(52) U.S. Cl. .................. 455/456; 455/521; 342/357.01; 342/357.06
(58) Field of Search ................................ 455/456, 521, 455/404, 457; 342/357.01, 357.06, 450, 457; 701/207, 213

(56) References Cited

U.S. PATENT DOCUMENTS

| | | | |
|---|---|---|---|
| 4,426,712 A | 1/1984 | Gorski-Popiel | |
| 4,445,118 A | 4/1984 | Taylor et al. | |
| 4,463,357 A | 7/1984 | MacDoran | |
| 4,578,678 A | 3/1986 | Hurd | |
| 4,667,203 A | 5/1987 | Counselman, III | |
| 4,701,934 A | 10/1987 | Jasper | |
| 4,754,465 A | 6/1988 | Trimble | |
| 4,785,463 A | 11/1988 | Janc et al. | |
| 4,809,005 A | 2/1989 | Counselman, III | |
| 4,821,294 A | 4/1989 | Thomas, Jr. | |
| 4,890,233 A | 12/1989 | Ando et al. | |
| 4,894,662 A | 1/1990 | Counselman | |
| 4,998,111 A | 3/1991 | Ma et al. | |
| 5,014,066 A | 5/1991 | Counselman, III | |
| 5,036,329 A | 7/1991 | Ando | |
| 5,043,736 A | 8/1991 | Darnell et al. | |
| 5,108,334 A | 4/1992 | Eschenbach et al. | |
| 5,202,829 A | 4/1993 | Geier | |
| 5,223,844 A | * 6/1993 | Mansell et al. | 342/357.07 |
| 5,225,842 A | 7/1993 | Brown et al. | |
| 5,293,170 A | 3/1994 | Lorenz et al. | |
| 5,311,195 A | 5/1994 | Mathis et al. | |

(List continued on next page.)

FOREIGN PATENT DOCUMENTS

| | | |
|---|---|---|
| EP | WO 90/11652 | 10/1990 |
| EP | 0511741 | 11/1992 |
| GB | 2115195 | 1/1983 |
| JP | 58-105632 | 6/1983 |
| JP | 7-36035 | 5/1986 |
| JP | 4-326079 | 11/1992 |

Primary Examiner—Edward F. Urban
Assistant Examiner—Erika A Gary
(74) Attorney, Agent, or Firm—Hogan & Hartson, LLP

(57) ABSTRACT

The present invention discloses a GPS system that can operate in different modes depending on the network facilities and bandwidth available, the GPS information that can be acquired, or user or system requirements. The modes comprise standalone mode, where a mobile communications device computes the position of the device, an autonomous mode, where the mobile communications device transmits the computed position to a server, application, or PSAP in a communications network, a network aided mode, where the network aides the mobile communications device in determining the position of the device, a network based mode, and other modes.

20 Claims, 6 Drawing Sheets

U.S. PATENT DOCUMENTS

| | | | | |
|---|---|---|---|---|
| 5,323,164 | A | 6/1994 | Endo | |
| 5,343,209 | A | 8/1994 | Sennott et al. | |
| 5,345,244 | A | 9/1994 | Gildea et al. | |
| 5,347,536 | A | 9/1994 | Meehan | |
| 5,379,224 | A | 1/1995 | Brown et al. | |
| 5,402,347 | A | 3/1995 | McBurney et al. | |
| 5,416,712 | A | 5/1995 | Geier et al. | |
| 5,420,593 | A | 5/1995 | Niles | |
| 5,440,313 | A | 8/1995 | Osterdock et al. | |
| 5,450,344 | A | 9/1995 | Woo et al. | |
| 5,504,684 | A | 4/1996 | Lau et al. | |
| 5,506,587 | A | 4/1996 | Lans | 342/357 |
| 5,592,173 | A | 1/1997 | Lau et al. | |
| 5,625,668 | A | 4/1997 | Loomis et al. | |
| 5,663,734 | A | 9/1997 | Krasner | |
| 5,663,735 | A | 9/1997 | Eshenbach | |
| 5,781,156 | A | 7/1998 | Krasner | |
| 5,786,789 | A | 7/1998 | Janky | |
| 5,812,087 | A | 9/1998 | Krasner | |
| 5,825,327 | A | 10/1998 | Krasner | |
| 5,828,694 | A | 10/1998 | Schipper | |
| 5,831,574 | A | 11/1998 | Krasner | |
| 5,841,396 | A | 11/1998 | Krasner | |
| 5,845,203 | A | 12/1998 | LaDue | |
| 5,854,605 | A | 12/1998 | Gildea | |
| 5,874,914 | A | 2/1999 | Krasner | |
| 5,877,724 | A | 3/1999 | Davis | |
| 5,877,725 | A | 3/1999 | Kalafus | |
| 5,883,594 | A | 3/1999 | Lau | |
| 5,884,214 | A | 3/1999 | Krasner | |
| 5,889,474 | A | 3/1999 | LaDue | |
| 5,903,654 | A | 5/1999 | Milton et al. | |
| 5,907,809 | A | 5/1999 | Molnar et al. | |
| 5,917,444 | A | 6/1999 | Loomis et al. | |
| 5,920,283 | A | 7/1999 | Shaheen et al. | |
| 5,923,703 | A | 7/1999 | Pon et al. | |
| 5,926,131 | A | 7/1999 | Sakumoto et al. | |
| 5,936,572 | A | 8/1999 | Loomis et al. | |
| 5,943,363 | A | 8/1999 | Hanson et al. | |
| 5,945,944 | A | 8/1999 | Krasner | |
| 5,963,582 | A | 10/1999 | Stansell, Jr. | |
| 5,977,909 | A | 11/1999 | Harrison et al. | |
| 5,982,324 | A | 11/1999 | Watters et al. | |
| 5,987,016 | A | 11/1999 | He | |
| 5,999,124 | A | 12/1999 | Sheynblat | |
| 6,002,362 | A | 12/1999 | Gudat | |
| 6,002,363 | A | 12/1999 | Krasner | |
| 6,009,551 | A | 12/1999 | Sheynblat | |
| 6,016,119 | A | 1/2000 | Krasner | |
| 6,041,222 | A | 2/2000 | Horton et al. | |
| 6,047,017 | A | 4/2000 | Cahn et al. | |
| 6,052,081 | A | 4/2000 | Krasner | |
| 6,061,018 | A | 5/2000 | Sheynblat | |
| 6,064,336 | A | 5/2000 | Krasner | |
| 6,104,338 | A | 8/2000 | Krasner | |
| 6,104,340 | A | 8/2000 | Krasner | |
| 6,107,960 | A | 8/2000 | Krasner | |
| 6,111,540 | A | 8/2000 | Krasner | |
| 6,111,541 | A | 8/2000 | Karmel | 342/357.13 |
| 6,131,067 | A | 10/2000 | Girerd et al. | |
| 6,133,871 | A | 10/2000 | Krasner | |
| 6,133,873 | A | 10/2000 | Krasner | |
| 6,133,874 | A | 10/2000 | Krasner | |
| 6,150,980 | A | 11/2000 | Krasner | |
| 6,188,351 | B1 * | 2/2001 | Bloebaum | 342/357.15 |
| 6,222,484 | B1 * | 4/2001 | Seiple et al. | 342/357.09 |
| 6,225,944 | B1 * | 5/2001 | Hayes | 342/357.1 |
| 6,249,245 | B1 * | 6/2001 | Watters et al. | 342/357.03 |
| 6,263,280 | B1 * | 7/2001 | Stingone, Jr. | 701/213 |
| 6,347,228 | B1 | 2/2002 | Ludden et al. | 455/456 |
| 6,389,291 | B1 * | 5/2002 | Pande et al. | 455/456 |

* cited by examiner

MULTI-MODE GLOBAL POSITIONING SYSTEM FOR USE WITH WIRELESS NETWORKS

CROSS-REFERENCE TO RELATED APPLICATIONS

This is a continuation of application Ser. No. 09/781,068, filed Feb. 8, 2001, now U.S. Pat. No. 6,389,291, which application is hereby incorporated by reference in its entirety.

This application claims priority under 35 U.S.C. §119(e) of United States Provisional Patent Application No. 60/225,076, filed Aug. 14, 2000, entitled "MULTI-MODE GLOBAL POSITIONING SYSTEM FOR USE WITH WIRELESS NETWORKS" by Ashutosh Pande, et al., which application is incorporated by reference herein.

BACKGROUND OF THE INVENTION

1. Field of the Invention

The present invention relates in general to Global Satellite System (GSS) receivers, and in particular to multi-mode Global Positioning System (GPS) for use with wireless networks.

2. Description of the Related Art

Cellular telephony, including Personal Communication System (PCS) devices, has become commonplace. The use of such devices to provide voice, data, and other services, such as internet access, has provided many conveniences to cellular system users. Further, other wireless communications systems, such as two-way paging, trunked radio, Specialized Mobile Radio (SMR) that is used by police, fire, and paramedic departments, have also become essential for mobile communications.

A current thrust in the cellular and PCS arena is the integration of Global Positioning System (GPS) technology into cellular telephone devices and other wireless transceivers. For example, U.S. Pat. No. 5,874,914, issued to Krasner, which is incorporated by reference herein, describes a method wherein the basestation (also known as the Mobile Telephone Switching Office (MTSO)) transmits GPS satellite information, including Doppler information, to a remote unit using a cellular data link, and computing pseudoranges to the in-view satellites without receiving or using satellite ephemeris information.

This current interest in integrating GPS with cellular telephony stems from a new Federal Communications Commission (FCC) requirement that cellular telephones be locatable within 50 feet once an emergency call, such as a "911" call (also referred to as "Enhanced 911" or "E911") is placed by a given cellular telephone. Such position data assists police, paramedics, and other law enforcement and public service personnel, as well as other agencies that may need or have legal rights to determine the cellular telephone's position. Further, GPS data that is supplied to the mobile telephone can be used by the mobile telephone user for directions, latitude and longitude positions (locations or positions) of other locations or other mobile telephones that the cellular user is trying to locate, determination of relative location of the cellular user to other landmarks, directions for the cellular user via internet maps or other GPS mapping techniques, etc. Such data can be of use for other than E911 calls, and would be very useful for cellular and PCS subscribers.

The approach in Krasner, however, is limited by the number of data links that can be connected to a GPS-dedicated data supply warehouse. The system hardware would need to be upgraded to manage the additional requirements of delivering GPS information to each of the cellular or PCS users that are requesting or requiring GPS data, which requirements would be layered on top of the requirements to handle the normal voice and data traffic being managed and delivered by the wireless system.

Another patent that concerns assistance between the GPS system and wireless networks is U.S. Pat. No. 5,365,450, issued to Schuchman, et al. which is incorporated by reference herein. In the Schuchman reference, ephemeris aiding through the cellular telephone system is required for the GPS receiver to acquire and track GPS satellites. However, cellular and other wireless networks do not always have the capability to provide ephemeris aiding to the mobile GPS receiver.

It can be seen, then, that there is a need in the art for delivering GPS data to wireless communications systems, including cellular and PCS subscribers, in an efficient manner. It can also be seen that there is a need in the art for GPS capable cellular and PCS telephones. It can also be seen that there is a need in the art for GPS capable cellular and PCS telephones that can receive GPS satellite data for use by the cellular/PCS subscriber. It can also be seen that there is a need in the art for a large cellular system that can use and/or supply GPS information to cellular users for a number of applications, including E911 without the requirement of geographically proximate basestations.

SUMMARY OF THE INVENTION

To minimize the limitations in the prior art described above, and to minimize other limitations that will become apparent upon reading and understanding the present specification, the present invention discloses a system, device, and method for determining the position of a mobile device. The system comprises a geolocation server and a wireless communications device. The geolocation server receives at least one signal from at least one GPS satellite. The wireless communications device comprises a GPS receiver section, wherein the GPS receiver can be selectively switched between a standalone mode and at least one other mode for determining a geolocation of the wireless communications device. The wireless communication device can selectively send the determined geolocation of the wireless communication device to the geolocation server.

It is an object of the present invention to provide a method and a system for delivering GPS data to wireless communications systems, including cellular and PCS subscribers in an efficient manner. It is another object of the present invention to provide a method and a system that can manage GPS capable cellular and PCS telephones. It is another object of the present invention to provide a method and a system for GPS capable cellular and PCS telephones that can receive GPS satellite data for use by the cellular/PCS subscriber. It is a further object of the present invention to provide a method and a system for large cellular systems to use that can use and/or supply GPS information to cellular users for a number of applications, including E911.

BRIEF DESCRIPTION OF THE DRAWINGS

Referring now to the drawings in which like reference numbers represent corresponding parts throughout.

DETAILED DESCRIPTION OF THE DRAWINGS

Figure 1:
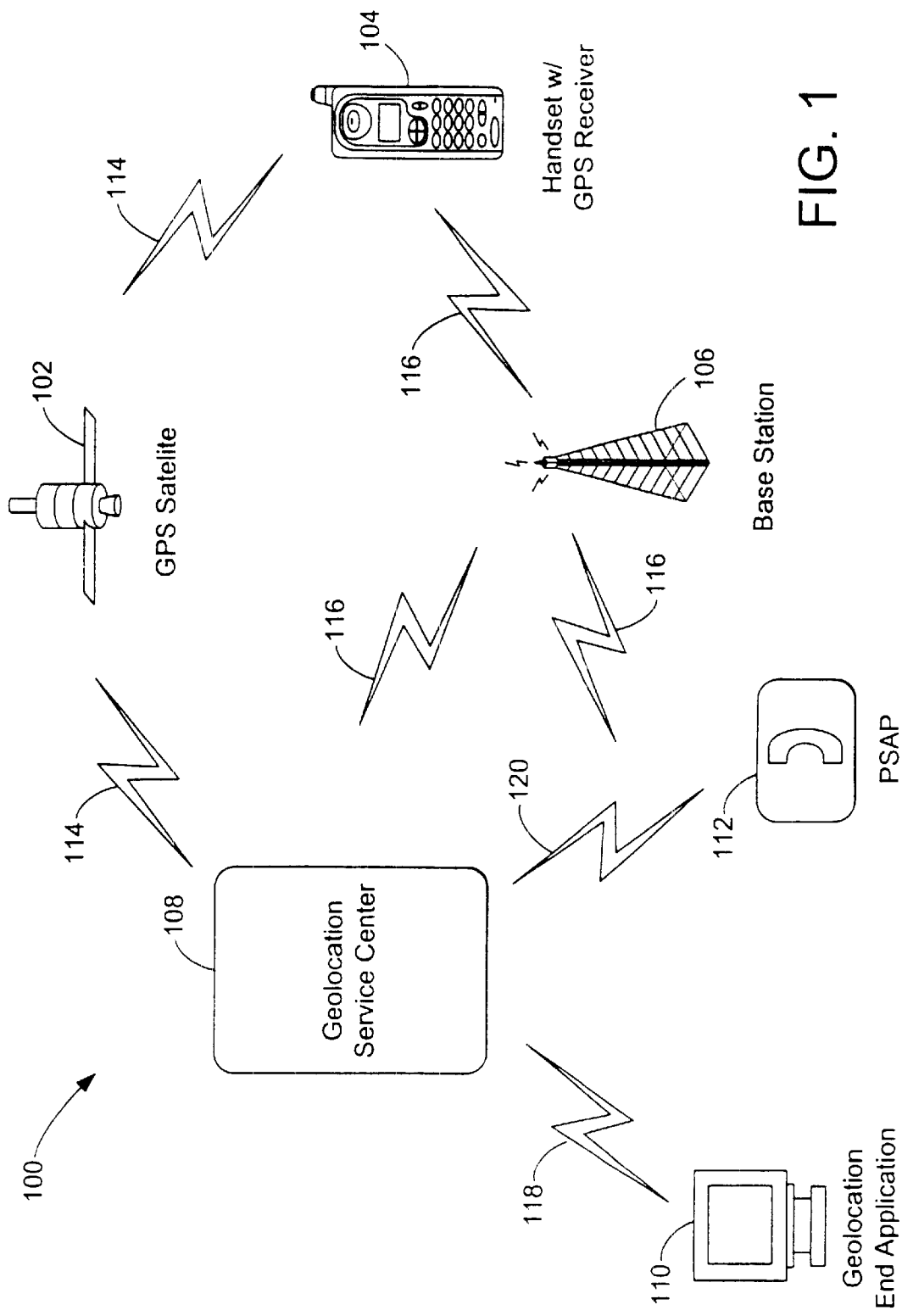
FIG. 1 illustrates a typical GPS architecture.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

When integrating GPS components with wireless communications systems (which include cellular, paging, two-way paging, Personal Data Assistant, Bluetooth, and PCS systems), the GPS system must have the capability to acquire and track the GPS satellites under the conditions that the typical wireless communications system user will encounter. Some of those conditions, e.g., indoor use, dense urban areas use that has a limited sky view, such as in downtown areas with skyscrapers blocking satellite views, etc., although manageable for terrestrial-based wireless communications systems, are difficult situations for GPS systems. For example, traditional standalone mode GPS, e.g., where the GPS receiver acquires the signals from the GPS satellites, tracks the satellites, and, if desired, performs navigation without any outside information being delivered to the GPS system, has problems with long Time To First Fix (TTFF) times, and, further, has limited ability to acquire the GPS satellite signals under indoor or limited sky-view conditions. Even with some additional information, TTFF times can be over thirty seconds because ephemeris data must be acquired from the GPS system itself, and also requires a strong signal to acquire such information reliably. These requirements of the GPS system have impacts on the reliability of position availability as well as power consumption in handheld wireless communications system devices.

To overcome these problems, the present invention allows for multiple modes of operation depending on various factors. The GPS system of the present invention can be used in a standalone mode, for example, when the GPS receiver is receiving a strong signal, has recent ephemeris or almanac data, or when an exact position is not required. However, if the GPS system of the present invention is not receiving a strong enough GPS signal, e.g., the handheld wireless communication device is being used indoors, the GPS system of the present invention can switch to a different mode of operation, e.g., a mode of operation where the wireless communication system helps or "aids" the GPS system to acquire, track, and/or navigate using the GPS signals received by the GPS receiver and additional information supplied by the wireless communications system. This mode of operation is called a "network aided" mode. Further still, the GPS system of the present invention, when being used in an even harsher signal reception environment, can be completely dependent on the wireless communications system to provide position information to the GPS receiver or mobile handset, and the GPS system of the present invention would then operate in a wireless communications network provided or "network based" mode of operation. The GPS system of the present invention can switch between these modes of operation based on several variables, as well as user-selected preferences or demands, and can switch either via local or remote control, or via either automatic or manual commands given to the GPS system.

In addition, the multi-mode operation of the present invention allows for additional benefits to accrue to the integrated GPS/wireless communications system as described herein.

GPS Architecture

FIG. 1 illustrates a typical GPS architecture.

The wireless handset location technology of the present invention uses GPS technology in support of various wireless handset devices for the implementation of E911 and geo-location services. By taking the advantage of the low cost, low power, high performance and high accuracy GPS receivers enabled by the present invention, as well as the wireless network communication services, the wireless handset location technology of the present invention provides highly reliable and economical solutions to the Wireless Aided GPS.

The wireless handset location technology of the present invention supports all kinds of geo-location services, from fully standalone mode, network aided mode, to network based service mode, to other modes. The technology of the present invention also accommodates wide range of wireless communication platforms, including CDMA, TDMA, AMP, and even pager systems. FIG. 1 portrays the concept of wireless handset location technology.

System 100 illustrates a GPS satellite 102, which is illustrative of the constellation of GPS satellites 102 that are in orbit, a wireless handset 104 that comprises a GPS receiver, a base station 106, a geolocation (server) service center 108, a geolocation end application 110, and a Public Safety Answering Point (PSAP) 112.

The GPS satellite 102 transmits spread spectrum signals 114 that are received at the wireless handset 104 and the geolocation server 108. For ease of illustrative purposes, the other GPS satellites 102 are not shown, however, other GPS satellites 102 also are transmitting signals 114 that are received by the wireless handset 104 and the geolocation server 108. If the wireless handset 104 can receive a strong enough signals 114, the GPS receiver in the wireless handset 104 can compute the position of the wireless handset 114 as is typically done in the GPS system. However, wireless handsets are typically not able to receive strong enough signals 114, or are not able to receive signals from enough GPS satellites 102 to autonomously compute the position of the wireless handset 104, but can still communicate with base station 106. Thus, base station 106 can communicate information via signals 116 to handset 104 to allow handset 104 to compute the location, or can communicate information from handset 104 to the geolocation server 108 to allow the geolocation server 108 to compute the position of the handset 104. If the basestation 106 is transferring information to the handset 104 to allow the handset 104 to compute position, it is called "wireless-aided GPS," whereas when the basestation 106 transfers information from the handset 104 to the geolocation server 108 for the geolocation server 108 to compute the position of the handset 104 it with is called "network-centric GPS."

Geolocation server also communicates with geolocation application 110 via signals 118 and with PSAP 112 via signals 120. These signals 118 and 120 can either be via wireless links or can be through the land line telephone network or other wire-based networks.

The wireless handset 104 location technology of the present invention comprises two major service systems: the wireless handset 104 with the GPS receiver of the present invention and the geo-location server 108 containing the geo-location software modules of the present invention. In addition, there are two types of supporting systems: the Base Station (BS) 106 infrastructure, which provides the network information transfer mechanism, and the PSAP 112 or the application 110 system, which can initiate the geo-location network services.

The handset 104 comprises a typical wireless handset 104 section that performs the call-processing (CP) function, and a GPS section for position computation, pseudorange measurement, and other GPS functions performed at the handset 104 of the present invention. A serial communication link, or other communications link, performs the communications between the CP section and the GPS section. A collection of hardware lines is utilized to transmit signals between the CP and GPS section.

Figure 2:
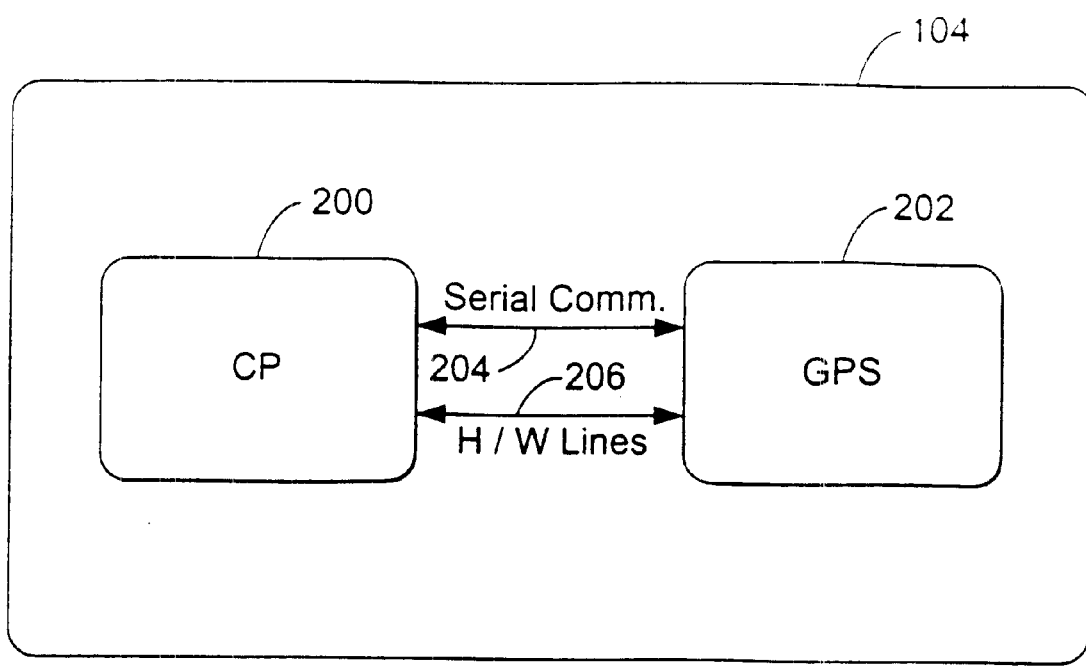
FIG. 2 shows the interface between the call processing section and the GPS section of the present invention.

FIG. 2 shows a typical interface between the Call Processing section and the GPS section of the present invention.

As shown in FIG. 2, handset 104 comprises a Call Processing (CP) section 200 and a Global Positioning System (GPS) section 202. Within handset 104, or, alternatively, between handset 104 and an external accessory to handset 104, communications between CP section 200 and GPS section 202 take place. These communications allow signals to be transferred from CP section 200 to GPS section 202, and typically take place on a serial communications link 204 and hardware lines 206, but other connections can be used if desired.

For example, in another implementation, the CP section 200 and the GPS section 202 can share the same digital processor and other circuitry. In such a case, the communication between sections can be made by inter-task communication, and certain data transfers, such as any time or frequency transfers between the CP section 200 and the GPS section 202, would not use hardware lines 206, but would be internal to the circuitry or, potentially, no transfer would be required depending on the circuit design.

Figure 3:
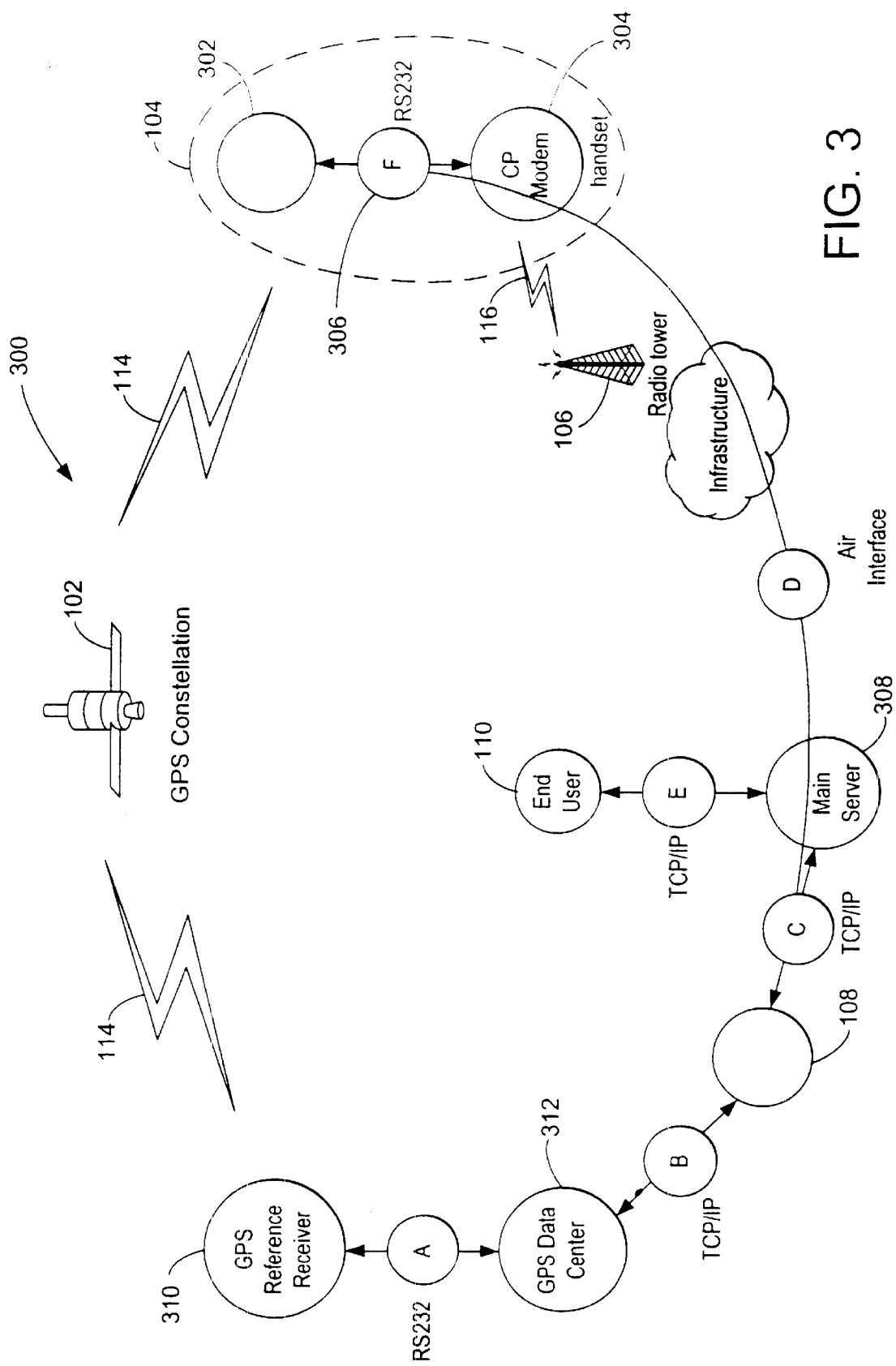
FIG. 3 illustrates another implementation of an end-to-end system in accordance with the present invention.

FIG. 3 illustrates another implementation of an end-to-end system of the present invention.

System 300 shows signals 114 that are received at handset 104, which comprises a GPS receiver client 302 and a CP section 304, connected by, typically, an RS232 data link 306. The CP section communicates with base station 106, which communicates with a main server 308 via the cellular and/or cellular/land-based telephone network. The main server 308 communicates with the geolocation server 108 and the application 110 via land-based or wireless networks, typically using TCP/IP protocols.

The GPS signals 114 are also received by a series of reference receivers 310 which compute the position of the reference receivers and extract data from the GPS signals 114. The extracted data, e.g., time, Doppler, frequency, etc. is sent to a GPS data center 312, for all of the satellites in the GPS constellation 102. When needed, the geolocation server 108 extracts data from the data center 312 for use by the handset 104, and transmits the needed or requested data from the handset 104 or the application 110. The main server can also interface to the PSAP 112 if desired, and the main server 308 and the geolocation server 108 can be co-located if desired or necessary.

Depending on the wireless network being used, e.g., cellular, PCS, two-way paging, Specialized Mobile Radio (SMR), Short Messaging Service (SMS), etc. the physical implementation of the present invention may vary from that shown in the figures. The figures are used for illustrative purposes only, and are not meant to limit the application of the present invention to other wireless systems. Further, the present invention can be used with hardwired systems, e.g., the landline telephone system, local area networks, etc., without departing from the scope of the present invention.

Figure 4:
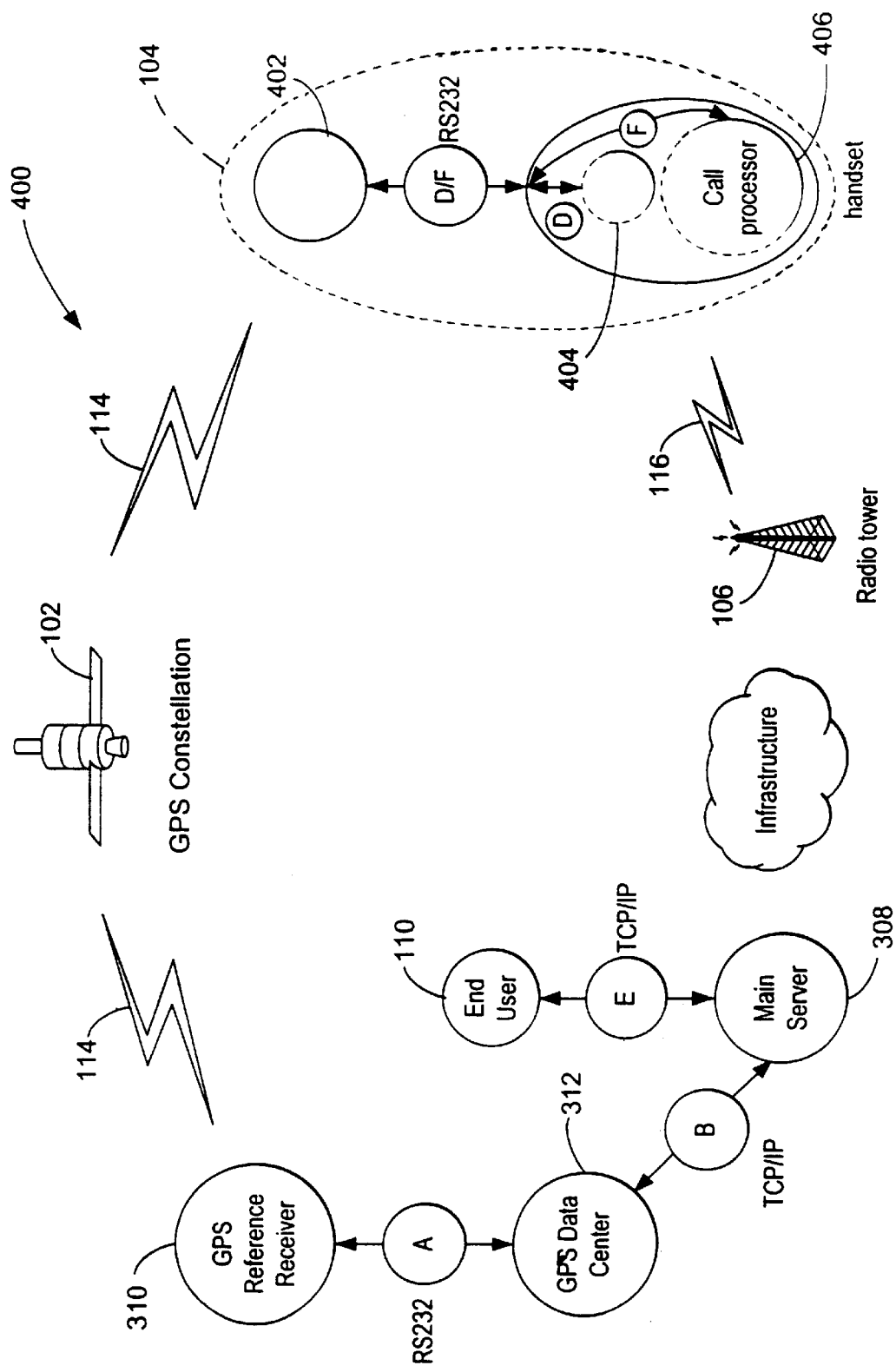
FIG. 4 illustrates a thin server implementation of the present invention.

FIG. 4 illustrates another embodiment of the present invention.

System 400 illustrates GPS constellation 102 transmitting signals 114 that are received by handset 104. Handset 104 comprises GPS receiver 402, also called the client 402, a server 404, and a CP section 406. In system 400, server 404 is known as a "thin server," since it will not have the same capabilities of server 108 described in FIG. 3. System 400 uses GPS reference receiver 310 to also receive signals 114 from GPS constellation 102, and stores the GPS data in data center 312. This information is transmitted to main server 308 when requested by application 110, or by handset 104, which uses server 404 to transmit the data back and forth between the CP section 406 and client 402. System 400 allows for some aiding data, e.g., ephemeris, to be stored in the cellular handset at the server 404, and then provided to the GPS client 402 on demand.

Multi-Mode GPS Operation with Wireless Networks

As described above, the system of the present invention can be operated in different modes depending on a number of variables, e.g., signal strength, operator intervention, type of services desired or requested, performance expectation, e.g., TIFF of a few seconds vs. tens of seconds, etc. The operation of each mode is described herein below.

Standalone Mode

In standalone mode, the GPS receiver 202 located in the mobile communications device (also known as a handset 104 or PDA) operates independently from the wireless communications network. The GPS receiver 202 acquires GPS satellite 102 signals 114, and uses those signals 114 to determine the location of the GPS receiver 202. The GPS receiver 202 also uses GPS satellite 102 signals 114 for tracking, and, if desired, navigation functions. The determined position is used internally to the mobile communications device 104.

Autonomous Mode

In autonomous mode, the position of the handset 104 is computed in a similar manner as in Standalone Mode, e.g., by the GPS receiver 202 in handset 104 without any assistance from the cellular or other communications network. However, instead of using the determined position internally to the handset 104, in autonomous mode, the handset 104 transmits the determined position of the handset 104 back to the communications network, e.g., to the geolocation server 108, to application 110, to PSAP 112, etc., through the wireless communications network.

Network-Aided Mode

A different mode of operation can be implemented such that the GPS receiver uses the wireless communications network to deliver some of the position information to the GPS receiver to "aid" the GPS receiver in the acquisition, tracking, and navigation functions. Such information comprises almanac or sub-almanac information, coarse position information, Doppler data, in-view satellite positions, time and frequency aid, received wireless radio signal strength (to obtain by analogy an idea of what to expect for the GPS signal strength), or other aids that will aid the GPS receiver in acquiring the information that the GPS receiver needs to acquire, navigate, or track. Such situations can occur when the GPS receiver has a limited view of the sky, or cannot acquire enough GPS signals on it's own, because the GPS receiver is blocked or otherwise unable to acquire the GPS satellite signals, or cannot track the satellites because of multipath problems. Further, such situations may also be desired by the user conditioned upon a given event, e.g., an E911 call is placed from the mobile handset, the user wants a very short TTFF, the user may desire additional network information to be included in the GPS calculation for increased accuracy, or other reasons.

The Network Aided approach differs from the Network Centric (Also called the Network Assisted mode in other literature) approach because in the Network Aided approach, the GPS receiver could, eventually, obtain the position and tracking information needed to locate the GPS receiver by itself. The Network Centric approach, as discussed in Krasner, cannot determine the position of the mobile receiver solely using the GPS information acquired from outside the wireless network, because the position calculation is done inside of the wireless network at the basestation, instead of in the mobile communications device as described in the present invention.

Further, the Network Aided approach, as described with respect to the present invention, allows for switching between standalone mode, autonomous mode, or other modes, once the initial acquisition has been made. The Network Aided mode and architecture of the present invention allows for the tracking, e.g., continuous update of user position to be done in Autonomous mode or standalone mode even in weak signal environments. The Network Assisted architecture of Krasner typically continues to depend on the network aid to calculate subsequent position.

The Network Aided mode is typically only used for acquisition of the GPS signal in weak signal environments. Once the GPS signal is acquired, the GPS receiver of the present invention can track the GPS signal without aid from the network. The Network Assisted mode of Krasner requires the network to assist the GPS receiver for tracking purposes as well as for acquisition.

Network Based Mode

A network based mode can also be used for situations when the GPS receiver cannot receive any GPS signals. As such, the GPS system is completely dependent on the wireless communications network to obtain any positioning information, and as such, is "centered" upon the information delivered by the wireless communications network. Typically, network-based modes compute position without using GPS or other satellite information. Positions of handsets 104 are derived from network resources, e.g., cellular transmitter towers and Time Difference Of Arrival (TDOA) techniques. When a handset 104 is in an area where it cannot receive GPS or other positioning system information to determine handset 104 position, such a mode can be useful.

Other Modes

The system of the present invention can, in Standalone, Autonomous, Network Aided, or Network Based modes, can also receive information from outside the wireless communications network as well as outside of the GPS satellite system. For example, in Autonomous mode or Standalone Mode, the GPS receiver can receive information from the GPS satellites and a Bluetooth network, while using the cellular wireless network to transmit voice or data. The GPS acquisition, tracking, and navigation functions can be enhanced with inputs from the Bluetooth network without using the cellular network. Similar scenarios can also be envisioned within the scope of the present invention that occur within the Network Aided or Network Based modes.

Further, the present invention can operate in a Reverse Aiding (RA) mode which sends GPS information back to the wireless communications network for use within the wireless communications network Further, the architecture and system of the present invention can be extended to wired networks such as the telephone network without departing from the scope of the present invention. For example, if GPS capabilities are present in a laptop or PDA and the device is connected to a wired or wireless Internet link, the GPS calculations can be aided via the Internet to calculate a position inside a building. The position can be displayed locally or sent to a server. Such a system can be used for security or other telephone or hardwired system applications.

The present invention can also be used for wireless Network monitoring, where the position information, alongside with the wireless signal strength, or any position-related information, can be collected from every user requesting assistance, at a central place in the network, to continuously monitor the cell coverage area, the amount of traffic within a single cell, where the traffic is concentrated, what are the areas of bad wireless reception, to help in the decisions of adding new base stations, or relocating them. The quality of service can be monitored in real-time by all the mobile systems used in the area.

Comparison of the Operation Modes

The operation modes of the present invention allow further flexibility within the GPS receiver framework. When the GPS receiver is not constrained by short TTFF requirements, or by network bandwidth, or by other signal demands, the GPS receiver of the present invention can be programmed to automatically select a given acquisition mode. For example, when the network traffic is heavy, which translates to a small bandwidth availability in the wireless communications network, the present invention allows the user to automatically or manually select the autonomous mode or standalone mode, which is not dependent on the wireless communications network for aiding information. In the same way, when the geolocation server 108 usage is heavy, and the aiding information latency time is incompatible with the requirements, the user can select, either automatically or manually, the autonomous or standalone mode. However, if additional bandwidth in the wireless network is available, or if the user needs a short TTFF for an E911 call, the present invention allows for manual or automatic override of the autonomous or standalone mode of operation into either autonomous or standalone (if ephemeris is current and there is implicit aiding information), the Network Based or network aided modes. Further, if the network is unable to deliver the reliability required, or the network does not have aiding capabilities, the GPS can use other modes or other sources of information to augment the autonomous or standalone mode, in an operational mode called "Augmented Autonomous Mode (AAM)." AAM can be used with Bluetooth, or other sensors such as pressure, accelerometers, or gyros to provide the GPS with aids outside of the network being used for communications. For example the present invention can use Bluetooth transmitters in every floor of a high rise sending its location and floor information to the phone and this 'augmented information' will be sent in case GPS cannot be acquired inside the building to deliver positioning data.

The multimode architecture of the present invention allows for an automatic seamless and reliable response, by taking advantage of the network assists if and when available, and allows the system to operate independently if the assistance is not available or not available in a timely manner. The Network aided operational mode overcomes the start-up limitations of the autonomous or standalone GPS and allows same level of performance as the Network Based mode, but does not require continuous network connectivity after start-up. If the aiding data (ephemeris, approximate location, approximate time etc.) has been received by the cellular phone over some communication medium, the communication link could be off when the GPS is started. This is the store and forward method of having a thin server directly mounted on the wireless communications device. The seamless nature and flexibility of the architecture enables service providers to tune the system to meet their needs based on the capabilities of the network and the type of services desired.

Further, the selection of the operational mode can depend on the type of service or the accuracy that the user has requested or demanded from the system. For example, if the user places an E911 call, the GPS receiver can automatically be placed in the mode that will provide the most accurate position information in the most timely manner possible. That mode may be Network Based, but, if the network cannot supply a complete GPS information set such that the mobile GPS receiver can determine position calculation information, the receiver can switch to Network Aided, such that the processing capabilities of the network and the GPS receiver are being used in parallel. As another example, if a user is requesting directions to a specific location, the receiver can automatically select autonomous or standalone mode which will provide information in a timely manner, but not place such demands on the power supply and processing capabilities of the system. Further, the present invention allows the user to override the automatic choice of operational mode. The system can also switch between modes once a predetermined event, e.g., the first position calculation of the GPS receiver, is obtained. For example, if an E911 call is placed, the present invention may select Network Aided mode to get the position information to the handset as fast as possible. Once that information is delivered, and the first position is calculated, the present invention may switch to a different mode, such as autonomous mode or standalone mode to make additional bandwidth in the wireless communications network available to other users. The architecture of the present invention also allows for reception of aiding information and gives the user the choice to accept that the position be sent back to the network, or "locked" in the mobile system, available only to the user, if the user wants it for privacy reasons.

The architecture of the present invention also gives the user the choice of preventing the network connection for assistance, even when the GPS receiver has determined it is necessary to reach the user's requirements, in the case the network access is charged to the user on a per use basis. In such a circumstance, the GPS receiver will attempt to provide a position in standalone mode, but with no guarantee about fulfilling the original user's requirements. The present invention thus allows for the bandwidth of the wireless communications network to be managed such that the bandwidth can be used more efficiently. Further, the present invention allows for dynamic allocation of the network resources, including the processing available on the GPS receiver, to process as much information in parallel as possible. This allows for dynamic loading of the GPS client and network server processors to more efficiently calculate position for multiple users. This approach allows for an increased number of wireless communications system users without significantly affecting the infrastructure of the wireless communications system.

Multi Correlator Architecture

To assist the system of the present invention, multiple correlators can be used to provide the system with a shorter TTFF, a more accurate position, or a more reliable result with fewer transfers from Autonomous or Standalone Mode to the Network Aided mode or Network Based mode.

Distributed Smart Client/Server Architecture

By allowing the GPS receiver (also known as the client) and the wireless communications system (also called the server) to distribute the workload of acquisition, tracking, and navigation tasks in an intelligent manner, the present invention allows for faster acquisition, faster TTFF times, and allows parts of the GPS receiver system to be powered down or selectively powered to reduce power consumption of the GPS portion of the mobile device.

The architecture of the present invention also allows for advance qualification of ephemeris data, e.g., validation of stored ephemeris data quality, by using the network aided mode to verify that the stored ephemeris data at the GPS receiver is still valid. Similarly, the Network Aided mode allows the present invention to derive coarse location data to be used for a Coarse Location Acquisition scenario, where a timetag approximate position based on known ephemeris or almanacs and post processing of the data is used for actual location determination.

The Other (Augmented Autonomous) Mode also allows for the use of low power short range wireless technology, such as Bluetooth, to aid the GPS receiver in reducing Time To First Fix (TTFF) times, as well as using low power short range wireless technology to aid GPS receiver with approximate location.

The present invention also allows correction information to be sent to the GPS system via the wireless communications network, by switching between the Autonomous or Standalone and Network Aided modes, or by remaining in the Network Aided mode, for slow changing errors to obtain precise local position, e.g., Iono correction factors, new sub-almanac information, etc. The present invention also can allow for data "fusion" from various sources, e.g., accelerometer, pressure sensors, tilt meters, etc. also present on the wireless communications device to add to the accuracy of the position determination, as well as providing the wireless communications device with approximate location, time, and frequency information to assist the wireless communications device in determination of a more precise position determination and/or improve the TTFF time for each client Reverse Aiding The present invention also comprises an apparatus for sharing a common frequency reference between a location determination device and a wireless communication equipment, which can Reverse Aid (RA) the wireless communications system to steer or direct transmission beams to the wireless handset. This will allow additional frequency reuse or code reuse within a cell, since the wireless communications system can now used phased array technology to beam steer or beam form a shaped transmission beam that is centered upon each mobile user. This allows for lower transmitter power to be used from the basestation transmitter, as well as lower power from the mobile user, because the formed or steered beam typically has more gain than an omnidirectional beam pattern. This feature of the present invention helps to optimize the communications links and increase the capacity of wireless communications system basestations, which, in Code Division Multiple Access (CDMA) networks is very useful, since the capacity of CDMA networks are limited by the noise floor increase as more users are placed on the network, not by the code efficiency.

RA can also be used for accelerating the acquisition and code synchronization onto the wireless network by providing very accurate absolute time and frequency references. RA can also be used to help to determine when to switch to another base station by using the GPS position (GPS-aided base station hand-over).

RA can also be used from mobile to mobile, using the network only as communication medium, where a first mobile system gets an absolute time information, measures the difference between network time and GPS time, and sends back the information to the network. The next user requesting GPS aiding information will receive the GPS time versus network time difference, and will correct the network time of this information to get GPS time to help in its own GPS acquisition process.

In another embodiment, the network, receiving redundant calibration information from several users in the same area for different points in time, can model the network time offset and frequency drift, and predict its value in the future. This way, the network can provide timing assistace information to a new mobile, even after a period where no information is received from any mobile.

RA from user to user also applies to frequency transfer, where the frequency error measured between network frequency and GPS frequency in a mobile is sent back to the network, and sent back to a new user as part of the assistance information.

Direct GPS aiding from mobile to mobile without using the server can also be used without intervention of a server momentarily storing assistance information before retransmitting to the next user requiring aiding. A mobile having acquired a position, having valid ephemeris and possibly network time and frequency error versus GPS, can broadcast this information to any other mobile in the same vicinity via the basestation.

RA can also be used to correct multipath problems at the client, because the terrestrial based wireless communications network can assist in the modeling of the multipath and/or provide modeling tools to help correct the multipath reception problems at the client given the position of the client.

Further, the present invention allows RA to use velocity information from a GPS receiver to assist the wireless communication system in aligning the Phase Locked Loop (PLL) to address problems associated with user motion. In particular, it can increase the effective wireless cell radius by guiding the wireless tracking loops using the absolute user velocity information from GPS, and thus allow wireless operation at lower radio signal strengths.

Time and Frequency Aiding

Wireless network systems typically have high quality reference clocks, and some wireless network systems, such as CDMA, are synchronized on absolute GPS time. The present invention allows for the wireless network frequency reference to be transferred to the GPS section of the handset to estimate GPS clock frequency offset and significantly reduce the frequency uncertainty. The GPS time reference can also be transferred to the GPS section to the GPS clock time. The main purpose of time and frequency transfer is to reduce the uncertainties of receiver clock time and frequency, thus, to improve the TTFF. The time transfer can also contribute to improve the sensitivity.

Time Transfer

Figure 5:
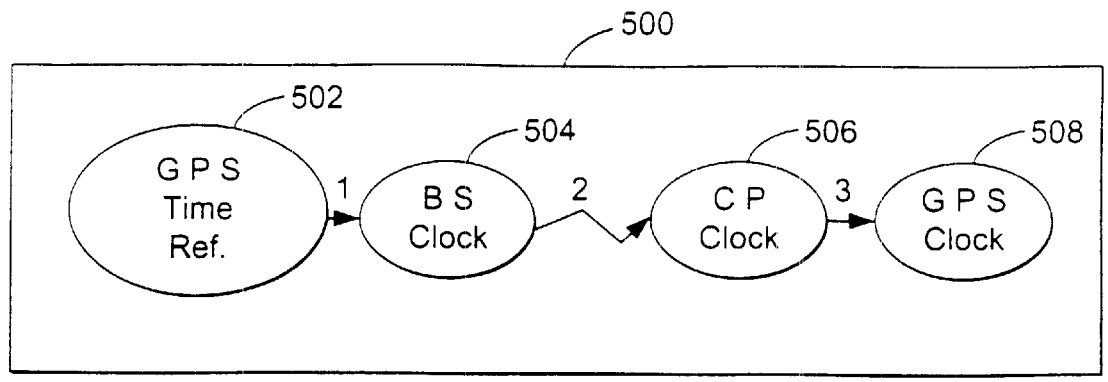
FIG. 5 illustrates time transfer between the GPS time reference and the GPS clock in accordance with the present invention.

FIG. 5 illustrates a time transfer mechanism as used in conjunction with the present invention.

System 500 illustrates a typical wireless network systems synchronized on absolute GPS time, such as CDMA or GSM with Location Measurement Units (LMU). Typically, the GPS time reference 502 is transferred to the GPS section of the handset 104 to synchronize GPS clock time with GPS time. For the wireless handset location system of the present invention, the time transfer can be accomplished in three steps.

In the first step, the Base Station (BS) clock 504 can be synchronized to the GPS time reference 502. The time accuracy at the BS clock 504 depends on the system configuration and can be in the range of 100 to 300 nanoseconds. This is a built-in feature of certain types of networks.

In the second step, the CP clock 506 is synchronized onto the BS clock 504 by timing the reception of one specific event in the master frame transmitted from the BS dock 504 to the CP clock 506. The BS clock 504 transmits the master frame with the transmission time of the first bit predictable in absolute GPS time with an accuracy of 300 nanoseconds. The synchronization error between the BS clock 504 and the CP clock 506 is caused by the RF reference point in the BS clock 504 signal, group delay in the BS dock 504, signal transmission time due to the distance between the handset 104 and the base station, the group delay in the CP section, and the handset 104 architecture.

As long as the handset 104 tracks the base station, the CP section of the handset 104 knows the absolute GPS time and can predict the associated accuracy of the GPS time at the handset 104, measured and adjusted during product integration phase, not in real time. If the handset 104 loses track of the base station or the BS clock 504, the CP clock 506 accuracy will degrade. The CP clock 506 performance degradation can be predicted based on the CP clock 506 frequency stability, which is normally represented by the Allan variance, and the age of the last tracking.

The wireless handset location system of the present invention is designed to be air-interface independent. As the handset 104 manufacturer has the knowledge of tracking conditions, the CP clock 504 frequency stability, and the air-interface performance, the handset 104 manufacturer can determine the preferred or best method to provide models and/or interfaces to the GPS clock 508 to transfer the absolute GPS time and the associated accuracy including all uncertainty effects.

In the third step, the GPS dock 508 asks the CP section clock 506 for a time transfer message via the communications link between the GPS section and the CP section. Typically, this time transfer request message contains no parameter.

The CP section 200 can react to such a message in several different ways. The CP section can generate a precise timing event and return a lime transfer response message. The timing event is typically a single rectangular pulse, with either a rising edge active or falling edge active. The time transfer response message typically contains the time of the timing event in GPS week, seconds into the week, and time uncertainty in seconds. By timing the timing event using the GPS clock 508, the GPS clock 508 is synchronized onto CP clock 506 time.

The CP section 200 can also send a "delta" message back to the GPS section. For example, the CP section 200 or GPS section 202 can monitor the CP clock 506 and GPS clock 508. When a time transfer request is made, the CP section 200, or the GPS section 202, whichever section is monitoring the clocks, receives a GPS time 502, a difference calculation is made between the GPS clock 508 and the GPS time 502. This delta can then be used for GPS calculations and position determinations until a new time transfer is requested.

The timing information is typically required when the GPS section 202 begins a new search on a new GPS satellite 102. The timing synchronization can be made only periodically at the request of the GPS section 202. The effective time accuracy available for the search will be degraded over time since the last recalibration due to the quality of the GPS clock 508; however, the approach described with respect to the present invention reduces or eliminates the need for locking the GPS clock 508 to the CP clock 506, as well as having the CP clock 506 locked to the GPS time reference 502 via the BS clock 504. The frequency stability of the GPS dock 508 represented by its Allan variance as well as the frequency stability over temperature will be utilized to predict the time uncertainty at the beginning of the GPS satellite 102 signal search. The present invention aides the handset 104 in correctly predicting the time degradation effects, to choose the time transfer periodicity, and to implement the time transfer since the control of the GPS clock 508 choice and when the next search is made is under the control of the system of the present invention.

Frequency Transfer

Figure 6:
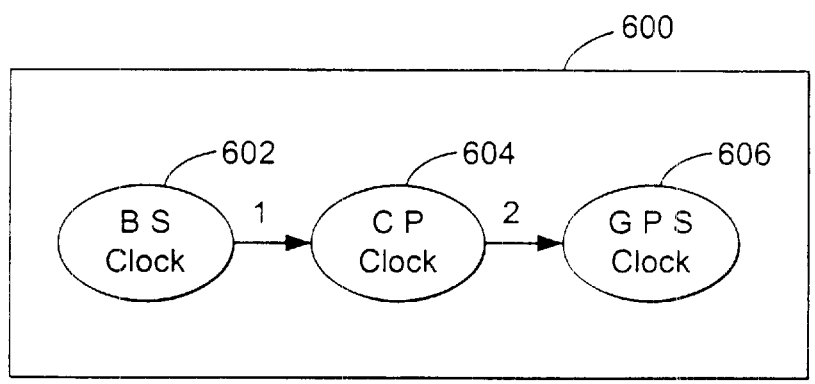
FIG. 6 illustrates a frequency transfer block diagram in accordance with the present invention.

FIG. 6 illustrates frequency transfer as used in conjunction with the present invention.

Within a cellular telephone system, such as the CDMA system used in the United States, each Base Station (BS) 106 has a high quality reference clock. System 600 shows that the BS clock 600, with an associated BS clock 600 frequency, can be transferred to the CP clock 602 and then to the GPS clock 604 as follows, to estimate the GPS clock 604 frequency offset as necessary.

Typically, the CP section 200 tracks the wireless network signals and measures the CP clock 604 frequency offset relative to the BS clock 602. The CP clock 604 frequency uncertainty after this measurement is caused by BS clock 602 frequency offset, which is specified by the network standards, handset 104 tracking loop performance, CP clock 604 frequency stability, and handset 104 motion.

The CP section 200 then periodically transmits a frequency calibration message to the GPS section 202. This message typically contains the error in frequency between the CP clock 604 and the BS clock 602. The frequency calibration message is sent at a period determined by the handset capabilities, as well as the necessity of the updates based on the GPS clock 606 and/or CP clock 604 requirements. For example, if the GPS clock 606 and CP clock 604 are both high quality crystals, the update message may be sent less often than if the GPS clock and the CP clock are both low quality crystals, or in some cases only once. However, the periodicity of the frequency error update is selectable by the handset 104 manufacturer. Because the GPS clock 606 is compared to the CP clock 604 at its own rate as described below, any CP clock 604 vs. BS clock 602 drift between frequency calibration messages will be added to the uncertainty of the GPS clock 606. Another method for setting the CP clock 604 is to steer the CP clock 604 onto the received signals and synchronized onto BS clock 602, which alleviates the need for a frequency calibration message.

Other approaches, such as U.S. Pat. No. 5,841,396, issued to Krasner, which is incorporated by reference herein, describe a phase-locked loop approach to locking the GPS clock 606 to the CP clock 604. The present invention avoids the additional circuitry and signal transfer between the CP section 200 and the GPS section 204 that is contemplated by such an approach, which makes the present invention easier and less expensive to implement in an existing cellular, wireless, or wired telephone system.

Figure 7:
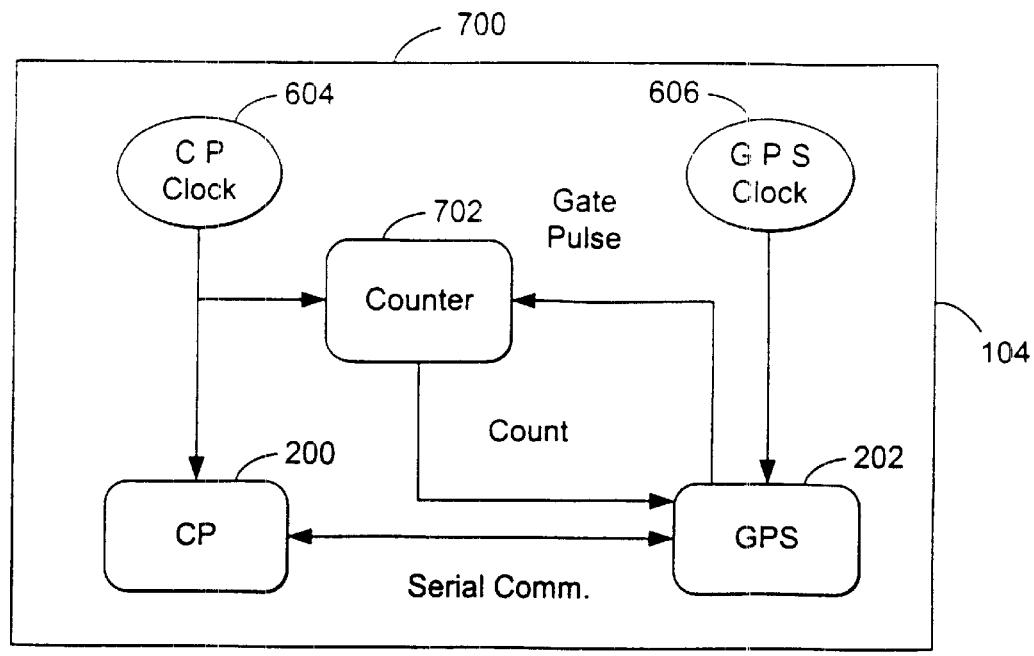
FIG. 7 illustrates a frequency transfer architecture in accordance with the present invention.

FIG. 7 illustrates the frequency transfer architecture used in conjunction with the present invention.

System 700 shows a system that can maintain the overall frequency error within limits imposed by the total frequency error budget without locking the GPS clock 606 to the CP dock 604. Handset 104 manufacturers can design specific bounds of the message periodicity depending on the residual budgeted frequency error after calibration and Allan variance characteristics of the CP dock 604. The transmitted information is the relative frequency error, not the absolute error (in Hz), because the GPS section 202 does not know the absolute frequency of the CP dock 604. The message that the GPS section 202 needs is independent from the nominal CP dock 604 frequency.

The GPS section 202, and the GPS dock 606, use the uncertainty information of the CP clock 604 frequency to optimize signal acquisition performance. Everything in the error budget, other than the handset 104 motion, depends on the wireless infrastructure and the CP section 200 architecture. The CP section 200 sends the GPS section 202 messages periodically, which messages contain CP clock 604 nominal frequency in Hz, e.g., the frequency of the divided CP clock 604 is sent to the counter 702 by the CP section 604 for measurement to convert absolute frequency error into a relative frequency error, CP clock 604 relative frequency offset vs. BS clock 602 frequency, and CP clock 604 frequency offset uncertainty.

The GPS section 202 then measures the relative frequency between the GPS clock 606 and the CP clock 604 using a counter 702. The effective width of the counter gating signal is determined by counting a predetermined number of GPS clock 606 pulses. The number of CP clock 604 pulses during this gating signal is used to determine the relative frequency error between the GPS clock 606 and the CP clock 604.

The frequency drift between frequency calibrations depends on the Allan variance of the GPS clock 606 and its stability over temperature. The periodicity of calibration can be adjusted depending on maximum frequency error allocated to the GPS clock 606, and quality of the GPS clock 606. In an alternate embodiment, or for convenience of implementation, a frequency divider can be inserted between CP clock 604 and Counter 702, thus reducing the absolute frequency to be measured by the counter.

Process Chart

Figure 8:
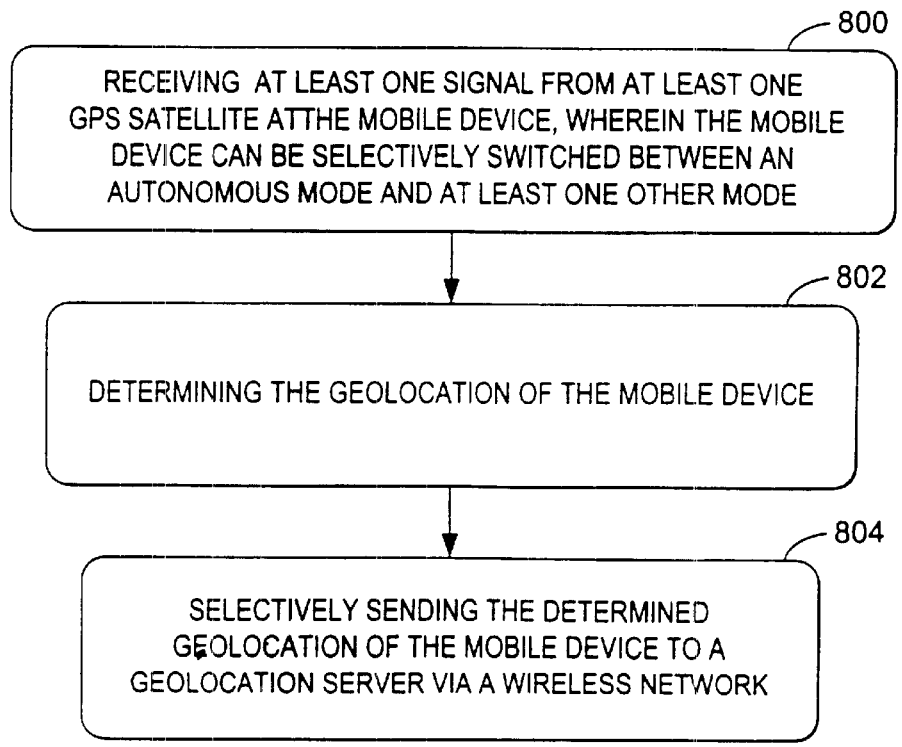
FIG. 8 is a flowchart illustrating the steps used to practice the present invention.

FIG. 8 is a flowchart illustrating the steps used to practice the present invention.

Block 800 illustrates receiving at least one signal from at least one GPS satellite at the mobile device, wherein the mobile device can be selectively switched between a standalone mode and at least one other mode.

Block 802 illustrates determining the geolocation of the mobile device.

Block 804 illustrates selectively sending the determined geolocation of the mobile device to a geolocation server via a wireless network.

Conclusion

This concludes the description of the preferred embodiment of the invention. The following paragraphs describe some alternative methods of accomplishing the same objects. The present invention, although described with respect to GPS systems, can be utilized with any Satellite Positioning System (SATPS) without departing from the scope of the present invention. Further, although described with respect to a cellular telephone system, other wireless or wire-based systems can be used in place of or in conjunction with the cellular system herein described without departing from the scope of the present invention. Other methods of frequency transfer and time transfer can be utilized without departing from the scope of the present invention.

In summary, the present invention discloses a system, device, and method for determining the position of a mobile device. The system comprises a geolocation server and a wireless communications device. The geolocation server receives at least one signal from at least one GPS satellite. The wireless communications device comprises a GPS receiver section, wherein the GPS receiver can be selectively switched between an autonomous mode or standalone mode and at least one other mode for determining a geolocation of the wireless communications device. The wireless communication device can selectively send the determined geolocation of the wireless communication device to the geolocation server.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but rather by the claims appended hereto.

What is claimed is:

1. A geolocation system, comprising:
   a geolocation server; and
   a wireless communications device comprising a GPS receiver section, wherein the GPS receiver section can be selectively switched between a first mode and at least one other mode for determining a geolocation of the wireless communications device, wherein the first mode and the at least one other mode are selected from a group comprising a standalone mode, an autonomous mode, a network aided mode, and a network centric mode, and the wireless communications device can selectively send the determined geolocation of the wireless communications device to the geolocation server.

2. The geolocation system of claim 1, wherein the GPS receiver switches between the standalone mode and the at least one other mode when a predetermined event occurs.

3. The geolocation system of claim 2, wherein the predetermined event occurs within a thirty second time window centered on a time of determination of the geolocation of the wireless device.

4. The geolocation system of claim 3, wherein the selective switching of the GPS receiver is performed automatically by the wireless communications device.

5. The geolocation system of claim 3, wherein the selective switching of the GPS receiver is performed manually at the wireless communications device.

6. The geolocation system of claim 3, wherein the selective sending of the determined geolocation of the wireless communications device is performed automatically by the wireless communications device.

7. The geolocation system of claim 3, wherein the selective sending of the determined geolocation of the wireless communications device is performed manually at the wireless communications device.

8. The geolocation system of claim 2, wherein the predetermined event is manually selected by a user.

9. The geolocation system of claim 2, wherein the predetermined event is initial acquisition of at least one GPS satellite signal.

10. The geolocation system of claim 9, wherein the selective switching of the GPS receiver switches the receiver from the at least one other mode to standalone mode.

11. The geolocation system of claim 10, wherein the at least one other mode is the network aided mode.

12. The geolocation system of claim 11, wherein the at least one other mode further comprises a reverse aiding mode.

13. The geolocation system of claim 12, wherein the wireless communications device can receive information from a second source.

14. The geolocation system of claim 13, wherein the second source of information is selected from a group comprising a bluetooth network, a Specialized Mobile Radio network, a Personal Communication System (PCS) network, a wireless Local Area Network, an infrared network, a paging network, a two-way paging network, or an FM broadcast network.

15. The geolocation system of claim 14, wherein the geolocation of the wireless communication device is determined using GPS satellite signals and the second source of information.

16. The geolocation system of claim 2, wherein the wireless communications device selectively displays the determined geolocation of the wireless communications device.

17. A method for determining the geoposition of a mobile device, comprising:
   receiving at least one signal from at least one GPS satellite at the mobile device, wherein the mobile device can be selectively switched into a mode selected from a group comprising a first mode and at least one other mode, wherein the first mode and the at least one other mode are selected from a group comprising a standalone mode, an autonomous mode, a network aided mode, and a network centric mode;
   determining the geolocation of the mobile device wherein the geolocation is determined using the selected mode, and wherein the determination of the geolocation occurs within a predetermined time period from the switching of the mobile device into the selected mode; and
   selectively sending the determined geolocation of the mobile device to a geolocation server via a wireless network.

18. The method of claim 17, wherein the determining of the geolocation is performed by the mobile device.

19. The method of claim 18, wherein the selective sending of the geolocation is performed by the mobile device, and the geolocation is sent from the mobile device to the geolocation server.

20. A wireless communications device, comprising:
   a call processing section for communicating with a wireless communications network; and
   a GPS receiver section, wherein the GPS receiver section can be selectively switched between a first mode and at least one other mode for determining a geolocation of the wireless communications device, wherein the first mode and the at least one other mode are selected from a group comprising a standalone mode, an autonomous mode, and a network aided mode, and wherein the selective switching occurs within a predetermined time period from the determination of the geolocation of the wireless communications device, and the wireless communications device can selectively send the determined geolocation of the wireless communications device to the call processing section for transmission over the wireless communications network.

* * * * *

UNITED STATES PATENT AND TRADEMARK OFFICE
CERTIFICATE OF CORRECTION

PATENT NO. : 6,519,466 C1
APPLICATION NO. : 10/068751
DATED : February 11, 2003
INVENTOR(S) : Pande et al.

It is certified that error appears in the above-identified patent and that said Letters Patent is hereby corrected as shown below:

Title Page
References Cited, U.S. PATENT DOCUMENTS, col. 2, line 9 delete
"4884041 A....11/1989....Walker

Page 3
Page 3, References Cited, U.S. PATENT DOCUMENTS, add --6111541 A....8/2000....Krasner--
Page 3, References Cited, U.S. PATENT DOCUMENTS, add --6122506 A....9/2000....Lau et al--

Page 4
References Cited, FOREIGN PATENT DOCUMENTS, add --EP.....0511741....4/1992--
References Cited, FOREIGN PATENT DOCUMENTS, add --EP.....639901.....8/1994--
References Cited, FOREIGN PATENT DOCUMENTS, add --EP.....1092987....4/2001--
References Cited, OTHER PUBLICATIONS, add --Van Nee et al., New Fast GPS Code-Acquisition Using FFT, Electronic Letters, Vo 27, No. 2, pp. 158-160 (1991)--

Signed and Sealed this
Fourth Day of January, 2011

David J. Kappos
*Director of the United States Patent and Trademark Office*

(12) EX PARTE REEXAMINATION CERTIFICATE (7518th)
United States Patent
Pande et al.

(10) Number: US 6,519,466 C1
(45) Certificate Issued: May 18, 2010

(54) MULTI-MODE GLOBAL POSITIONING SYSTEM FOR USE WITH WIRELESS NETWORKS

(75) Inventors: Ashutosh Pande, Milpitas, CA (US); Lionel Jacques Garin, Palo Alto, CA (US); Kanwar Chadha, Los Gatos, CA (US); Gregory Bret Turetzky, San Jose, CA (US)

(73) Assignee: Sirf Technology, Inc., San Jose, CA (US)

Reexamination Request:
No. 90/010,238, Aug. 6, 2008

Reexamination Certificate for:
Patent No.: 6,519,466
Issued: Feb. 11, 2003
Appl. No.: 10/068,751
Filed: Feb. 5, 2002

Related U.S. Application Data

(63) Continuation of application No. 09/781,068, filed on Feb. 8, 2001, now Pat. No. 6,389,291.
(60) Provisional application No. 60/225,076, filed on Aug. 14, 2000.

(51) Int. Cl.
*G01S 1/00* (2006.01)
*G01S 5/00* (2006.01)
*H04Q 7/38* (2006.01)

(52) U.S. Cl. .............................. 455/456.1; 342/357.01; 342/357.06; 455/521

(58) Field of Classification Search .................. None
See application file for complete search history.

(56) References Cited

U.S. PATENT DOCUMENTS

| | | |
|---|---|---|
| 3,604,911 A | 9/1971 | Schmitt |
| 3,975,628 A | 8/1976 | Graves |
| 4,426,712 A | 1/1984 | Gorski-Popiel |
| 4,445,118 A | 4/1984 | Taylor |
| 4,463,357 A | 7/1984 | MacDoran |
| 4,578,678 A | 3/1986 | Hurd |
| 4,667,203 A | 5/1987 | Counselman |
| 4,701,934 A | 10/1987 | Jasper |
| 4,754,465 A | 6/1988 | Trimble |
| 4,785,463 A | 11/1988 | Janc |
| 4,809,005 A | 2/1989 | Counselman |
| 4,821,294 A | 4/1989 | Thomas |
| 4,884,041 A | 11/1989 | Walker |
| 4,890,233 A | 12/1989 | Ando |
| 4,894,662 A | 1/1990 | Counselman |
| 4,894,842 A | 1/1990 | Broekhoven |
| 4,992,720 A | 2/1991 | Hata |
| 4,998,111 A | 3/1991 | Ma |
| 5,014,066 A | 5/1991 | Counselman |
| 5,018,088 A | 5/1991 | Higbie |

(Continued)

FOREIGN PATENT DOCUMENTS

| | | |
|---|---|---|
| EP | 0511741 | 4/1992 |
| EP | 639901 | 8/1994 |
| EP | 1092987 | 4/2001 |

(Continued)

OTHER PUBLICATIONS

Van Nee et al., New Fast GPS Code–Acquisition Using FFT, Electronic Letters, vol. 27, No. 2, pp. 158–160 (1991).

(Continued)

*Primary Examiner*—James Menefee

(57) ABSTRACT

The present invention discloses a GPS system that can operate in different modes depending on the network facilities and bandwidth available, the GPS information that can be acquired, or user or system requirements. The modes comprise standalone mode, where a mobile communications device computes the position of the device, an autonomous mode, where the mobile communications device transmits the computed position to a server, application, or PSAP in a communications network, a network aided mode, where the network aides the mobile communications device in determining the position of the device, a network based mode, and other modes.

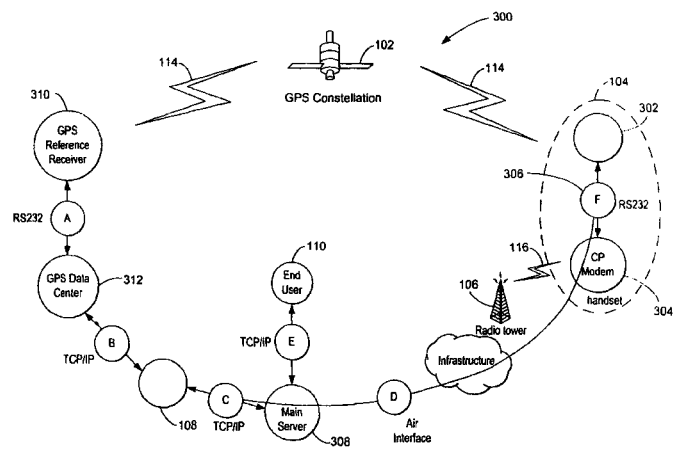

U.S. PATENT DOCUMENTS

| | | |
|---|---|---|
| 5,036,329 A | 7/1991 | Ando |
| 5,043,736 A | 8/1991 | Darnell |
| 5,108,334 A | 4/1992 | Eschenbach |
| 5,148,042 A | 9/1992 | Nakazoe |
| 5,153,591 A | 10/1992 | Clark |
| 5,172,076 A | 12/1992 | Brown |
| 5,177,490 A | 1/1993 | Ando |
| 5,179,724 A | 1/1993 | Lindoff |
| 5,202,829 A | 4/1993 | Geier |
| 5,223,844 A | 6/1993 | Mansell |
| 5,225,842 A | 7/1993 | Brown |
| 5,253,268 A | 10/1993 | Omura |
| 5,257,195 A | 10/1993 | Hirata |
| 5,276,765 A | 1/1994 | Freeman |
| 5,293,170 A | 3/1994 | Lorenz |
| 5,293,398 A | 3/1994 | Hamao |
| 5,297,097 A | 3/1994 | Etoh |
| 5,311,195 A | 5/1994 | Mathis |
| 5,323,164 A | 6/1994 | Endo |
| 5,343,209 A | 8/1994 | Sennott |
| 5,345,244 A | 9/1994 | Gildea |
| 5,347,284 A | 9/1994 | Volpi |
| 5,347,536 A | 9/1994 | Meehan |
| 5,352,970 A | 10/1994 | Armstrong |
| 5,363,030 A | 11/1994 | Ford |
| 5,365,450 A | 11/1994 | Schuchman |
| 5,378,155 A | 1/1995 | Eldridge |
| 5,379,224 A | 1/1995 | Brown |
| 5,396,515 A | 3/1995 | Dixon |
| 5,402,346 A | 3/1995 | Lion |
| 5,402,347 A | 3/1995 | McBurney |
| 5,402,441 A | 3/1995 | Washizu |
| 5,410,747 A | 4/1995 | Ohmagari |
| 5,416,712 A | 5/1995 | Geier |
| 5,418,538 A | 5/1995 | Lau |
| 5,418,818 A | 5/1995 | Marchetto |
| 5,420,592 A | 5/1995 | Johnson |
| 5,420,593 A | 5/1995 | Niles |
| 5,422,813 A | 6/1995 | Schuchman |
| 5,440,313 A | 8/1995 | Osterdock |
| 5,450,344 A | 9/1995 | Woo |
| 5,489,878 A | 2/1996 | Gilbert |
| 5,497,339 A | 3/1996 | Bernard |
| 5,498,239 A | 3/1996 | Galel |
| 5,504,684 A | 4/1996 | Lau |
| 5,506,587 A | 4/1996 | Lans |
| 5,519,403 A | 5/1996 | Bickley |
| 5,528,248 A | 6/1996 | Steiner |
| 5,535,278 A | 7/1996 | Cahn |
| 5,546,445 A | 8/1996 | Dennison |
| 5,548,553 A | 8/1996 | Cooper |
| 5,548,613 A | 8/1996 | Kahu |
| 5,550,811 A | 8/1996 | Kahu |
| 5,568,473 A | 10/1996 | Hemmati |
| 5,577,023 A | 11/1996 | Marum |
| 5,577,025 A | 11/1996 | Skinner |
| 5,587,715 A | 12/1996 | Lewis |
| 5,592,173 A | 1/1997 | Lau |
| 5,594,453 A | 1/1997 | Rodal |
| 5,608,722 A | 3/1997 | Miller |
| 5,623,414 A | 4/1997 | Misra |
| 5,623,485 A | 4/1997 | Bi |
| 5,625,668 A | 4/1997 | Loomis |
| 5,629,708 A | 5/1997 | Rodal |
| 5,635,879 A | 6/1997 | Sutardja |
| 5,640,429 A | 6/1997 | Michaels |
| 5,640,431 A | 6/1997 | Bruckert |
| 5,642,377 A | 6/1997 | Chung |
| 5,644,591 A | 7/1997 | Sutton |
| 5,649,000 A | 7/1997 | Lee |
| 5,650,792 A | 7/1997 | Moore |
| 5,654,718 A | 8/1997 | Beason |
| 5,663,734 A | 9/1997 | Krasner |
| 5,663,735 A | 9/1997 | Eshenbach |
| 5,666,330 A | 9/1997 | Zampetti |
| 5,689,814 A | 11/1997 | Hagisawa |
| 5,697,082 A | 12/1997 | Greer |
| 5,701,328 A | 12/1997 | Schuchman |
| 5,722,061 A | 2/1998 | Hutchison |
| 5,724,660 A | 3/1998 | Kauser |
| 5,726,893 A | 3/1998 | Schuchman |
| 5,733,786 A | 3/1998 | Greenspan |
| 5,734,674 A | 3/1998 | Fenton |
| 5,734,966 A | 3/1998 | Farrer |
| 5,737,329 A | 4/1998 | Horiguchi |
| 5,739,596 A | 4/1998 | Takizawa |
| 5,749,067 A | 5/1998 | Barrett |
| 5,757,786 A | 5/1998 | Joo |
| 5,761,456 A | 6/1998 | Titus |
| 5,764,184 A | 6/1998 | Hatch |
| 5,781,156 A | 7/1998 | Krasner |
| 5,784,695 A | 7/1998 | Upton |
| 5,786,789 A | 7/1998 | Janky |
| 5,796,662 A | 8/1998 | Kalter |
| 5,812,087 A | 9/1998 | Krasner |
| 5,825,327 A | 10/1998 | Krasner |
| 5,828,694 A | 10/1998 | Schipper |
| 5,831,545 A | 11/1998 | Murray |
| 5,831,574 A | 11/1998 | Krasner |
| 5,832,021 A | 11/1998 | Kondo |
| 5,832,247 A | 11/1998 | Gildea |
| 5,841,396 A | 11/1998 | Krasner |
| 5,845,203 A | 12/1998 | LaDue |
| 5,854,605 A | 12/1998 | Gildea |
| 5,862,465 A | 1/1999 | Ou |
| 5,867,535 A | 2/1999 | Phillips |
| 5,867,795 A | 2/1999 | Novis |
| 5,872,540 A | 2/1999 | Casabona |
| 5,874,914 A | 2/1999 | Krasner |
| 5,877,724 A | 3/1999 | Davis |
| 5,877,725 A | 3/1999 | Kalafus |
| 5,881,371 A | 3/1999 | Reynolds |
| 5,883,594 A | 3/1999 | Lau |
| 5,884,214 A | 3/1999 | Krasner |
| 5,887,020 A | 3/1999 | Smith et al. |
| 5,889,474 A | 3/1999 | LaDue |
| 5,889,492 A | 3/1999 | Kurby |
| 5,890,070 A | 3/1999 | Hamada |
| 5,893,044 A | 4/1999 | King |
| 5,897,605 A | 4/1999 | Kohli |
| 5,901,171 A | 5/1999 | Kohli |
| 5,903,654 A | 5/1999 | Milton |
| 5,907,578 A | 5/1999 | Pon |
| 5,907,809 A | 5/1999 | Molnar |
| 5,909,640 A | 6/1999 | Farrer |
| 5,917,383 A | 6/1999 | Tso |
| 5,917,444 A | 6/1999 | Loomis |
| 5,917,829 A | 6/1999 | Hertz |
| 5,920,283 A | 7/1999 | Shaheen |
| 5,923,703 A | 7/1999 | Pon |
| 5,924,024 A | 7/1999 | Ikeda |
| 5,926,131 A | 7/1999 | Sakumoto |
| 5,928,306 A | 7/1999 | France |
| 5,936,572 A | 8/1999 | Loomis |
| 5,940,027 A | 8/1999 | Forseth |
| 5,943,363 A | 8/1999 | Hanson |
| 5,943,381 A | 8/1999 | Zampetti |
| 5,945,944 A | 8/1999 | Krasner |
| 5,956,328 A | 9/1999 | Sato |
| 5,963,582 A | 10/1999 | Stansell |
| 5,963,851 A | 10/1999 | Blanco |

| | | | | | | |
|---|---|---|---|---|---|---|
| 5,966,403 | A | 10/1999 | Pon | 6,240,556 B1 | 5/2001 | Evans |
| 5,970,084 | A | 10/1999 | Honda | 6,249,245 B1 | 6/2001 | Watters |
| 5,977,909 | A | 11/1999 | Harrison | 6,249,542 B1 | 6/2001 | Kohli |
| 5,982,324 | A | 11/1999 | Watters | 6,252,543 B1 | 6/2001 | Camp |
| 5,983,109 | A | 11/1999 | Montoya | 6,255,988 B1 | 7/2001 | Bischoff |
| 5,987,016 | A | 11/1999 | He | 6,259,399 B1 | 7/2001 | Krasner |
| 5,991,309 | A | 11/1999 | Jensen | 6,263,280 B1 | 7/2001 | Stingone |
| 5,991,613 | A | 11/1999 | Euscher | 6,272,430 B1 | 8/2001 | Krasner |
| 5,995,537 | A | 11/1999 | Kondo | 6,289,041 B1 | 9/2001 | Krasner |
| 5,999,124 | A | 12/1999 | Sheynblat | 6,292,749 B2 | 9/2001 | Kohli |
| 5,999,125 | A | 12/1999 | Kurby | 6,295,023 B1 | 9/2001 | Bloebaum |
| 6,002,362 | A | 12/1999 | Gudat | 6,307,504 B1 | 10/2001 | Sheynblat |
| 6,002,363 | A | 12/1999 | Krasner | 6,313,786 B1 | 11/2001 | Sheynblat |
| 6,002,709 | A | 12/1999 | Hendrickson | 6,314,308 B1 | 11/2001 | Sheynblat |
| 6,009,551 | A | 12/1999 | Sheynblat | 6,314,365 B1 | 11/2001 | Smith |
| 6,011,509 | A | 1/2000 | Dutka | 6,327,473 B1 | 12/2001 | Soliman |
| 6,014,101 | A | 1/2000 | Loomis | 6,329,946 B1 | 12/2001 | Hirata |
| 6,016,119 | A | 1/2000 | Krasner | 6,347,228 B1 | 2/2002 | Ludden |
| 6,018,704 | A | 1/2000 | Kohli | 6,353,412 B1 | 3/2002 | Soliman |
| 6,023,462 | A | 2/2000 | Nieczyporowicz | 6,353,642 B1 | 3/2002 | Asahara |
| 6,040,798 | A | 3/2000 | Kinal | 6,373,429 B1 | 4/2002 | Eschenbach |
| 6,041,222 | A | 3/2000 | Horton | 6,377,209 B1 | 4/2002 | Krasner |
| 6,041,280 | A | 3/2000 | Kohli | 6,389,291 B1 | 5/2002 | Pande |
| 6,047,016 | A | 4/2000 | Ramberg | 6,393,046 B1 | 5/2002 | Kohli |
| 6,047,017 | A | 4/2000 | Cahn et al. | 6,400,314 B1 | 6/2002 | Krasner |
| 6,049,715 | A | 4/2000 | Willhoff | 6,400,753 B1 | 6/2002 | Kohli |
| 6,052,081 | A | 4/2000 | Krasner | 6,405,132 B1 | 6/2002 | Breed |
| 6,058,338 | A | 5/2000 | Agashe | 6,408,196 B2 | 6/2002 | Sheynblat |
| 6,061,018 | A | 5/2000 | Sheynblat | 6,411,254 B1 | 6/2002 | Moeglein |
| 6,064,336 | A | 5/2000 | Krasner | 6,411,811 B2 | 6/2002 | Kingdon |
| 6,064,688 | A | 5/2000 | Yanagi | 6,411,892 B1 | 6/2002 | Van Diggelen |
| 6,067,045 | A | 5/2000 | Castelloe | 6,414,987 B1 | 7/2002 | Pon |
| 6,075,809 | A | 6/2000 | Naruse | 6,417,801 B1 | 7/2002 | Van Diggelen |
| 6,075,987 | A | 6/2000 | Camp | 6,421,002 B2 | 7/2002 | Krasner |
| 6,081,229 | A | 6/2000 | Soliman et al. | 6,421,609 B2 | 7/2002 | Kohli |
| 6,085,090 | A | 7/2000 | Yee | 6,427,120 B1 | 7/2002 | Garin |
| 6,097,974 | A | 8/2000 | Camp | 6,429,809 B1 | 8/2002 | Vayanos |
| 6,104,338 | A | 8/2000 | Krasner | 6,429,814 B1 | 8/2002 | Van Diggelen |
| 6,104,340 | A | 8/2000 | Krasner | 6,429,815 B1 | 8/2002 | Soliman |
| 6,104,712 | A | 8/2000 | Robert | 6,430,503 B1 | 8/2002 | McBurney |
| 6,107,960 | A | 8/2000 | Krasner | 6,433,731 B1 | 8/2002 | Sheynblat |
| 6,111,540 | A | 8/2000 | Krasner | 6,433,739 B1 | 8/2002 | Soliman |
| 6,122,555 | A | 9/2000 | Lu | 6,453,237 B1 | 9/2002 | Fuchs |
| 6,125,325 | A | 9/2000 | Kohli | 6,456,234 B1 | 9/2002 | Johnson |
| 6,131,067 | A | 10/2000 | Girerd | 6,466,612 B2 | 10/2002 | Kohli |
| 6,133,871 | A | 10/2000 | Krasner | 6,477,363 B1 | 11/2002 | Ayoub |
| 6,133,873 | A | 10/2000 | Krasner | 6,484,097 B2 | 11/2002 | Fuchs |
| 6,133,874 | A | 10/2000 | Krasner | 6,487,499 B1 | 11/2002 | Fuchs |
| 6,134,483 | A | 10/2000 | Vayanos | 6,501,420 B2 | 12/2002 | Townsend |
| 6,150,980 | A | 11/2000 | Krasner | 6,505,161 B1 | 1/2003 | Brems |
| 6,172,640 | B1 | 1/2001 | Durst | 6,510,387 B2 | 1/2003 | Fuchs |
| 6,178,195 | B1 | 1/2001 | Durboraw | 6,522,682 B1 | 2/2003 | Kohli |
| 6,185,427 | B1 | 2/2001 | Krasner | 6,526,283 B1 | 2/2003 | Jang |
| 6,188,351 | B1 | 2/2001 | Bloebaum | 6,529,829 B2 | 3/2003 | Turetzky |
| 6,198,765 | B1 | 3/2001 | Cahn et al. | 6,535,815 B2 | 3/2003 | Bloebaum |
| 6,204,808 | B1 | 3/2001 | Bloebaum | 6,542,821 B2 | 4/2003 | Krasner |
| 6,208,290 | B1 | 3/2001 | Krasner | 6,546,232 B1 | 4/2003 | Sack. |
| 6,208,291 | B1 | 3/2001 | Krasner | 6,556,832 B1 | 4/2003 | Soliman |
| 6,209,090 | B1 | 3/2001 | Aisenberg | 6,559,793 B1 | 5/2003 | Eschenbach |
| 6,211,817 | B1 | 4/2001 | Eschenbach | 6,574,558 B2 | 6/2003 | Kohli |
| 6,211,819 | B1 | 4/2001 | King | 6,583,757 B2 | 6/2003 | Krasner |
| 6,215,441 | B1 | 4/2001 | Moeglein | 6,590,945 B1 | 7/2003 | Brardjanian |
| 6,215,442 | B1 | 4/2001 | Sheynblat | 6,597,311 B2 | 7/2003 | Sheynblat |
| 6,222,483 | B1 | 4/2001 | Twitchell | 6,611,755 B1 | 8/2003 | Coffee |
| 6,222,484 | B1 | 4/2001 | Seiple | 6,633,255 B2 | 10/2003 | Krasner |
| 6,225,944 | B1 | 5/2001 | Hayes | 6,633,814 B2 | 10/2003 | Kohli |
| 6,229,478 | B1 | 5/2001 | Biacs | 6,650,694 B1 | 11/2003 | Brown |
| 6,236,354 | B1 | 5/2001 | Krasner | 6,662,103 B1 | 12/2003 | Skolnick |
| 6,236,365 | B1 | 5/2001 | LeBlanc | 6,671,620 B1 | 12/2003 | Garin |
| 6,236,937 | B1 | 5/2001 | Kohli | 6,677,894 B2 | 1/2004 | Sheynblat |
| 6,239,742 | B1 | 5/2001 | Krasner | 6,707,423 B2 | 3/2004 | Turetzky |

| | | |
|---|---|---|
| 6,720,920 B2 | 4/2004 | Breed |
| 6,724,811 B2 | 4/2004 | Kohli |
| 6,731,238 B2 | 5/2004 | Johnson |
| 6,748,015 B2 | 6/2004 | Kohli |
| 6,748,198 B1 | 6/2004 | Salo |
| 6,748,217 B1 | 6/2004 | Hunzinger |
| 6,771,625 B1 | 8/2004 | Beal |
| 6,778,885 B2 | 8/2004 | Agashe |
| 6,829,534 B2 | 12/2004 | Fuchs |
| 6,871,061 B1 | 3/2005 | Koorapaty |
| 6,873,288 B2 | 3/2005 | Heppe |
| 6,901,171 B1 | 5/2005 | Dutta-Choudhury |
| 7,010,270 B1 | 3/2006 | Thomas |
| 7,142,878 B1 | 11/2006 | Barroso |
| 7,263,440 B2 | 8/2007 | Garin |
| 7,577,448 B2 | 8/2009 | Pande |
| 2001/0002203 A1 | 5/2001 | Cahn |
| 2001/0012771 A1 | 8/2001 | Ruiz |
| 2002/0002592 A1 | 1/2002 | Aoki |
| 2002/0019698 A1 | 2/2002 | Vilppula |
| 2002/0064209 A1 | 5/2002 | Turetzky |
| 2002/0070881 A1 | 6/2002 | Tseng |
| 2002/0072854 A1 | 6/2002 | Fuchs |
| 2002/0080063 A1 | 6/2002 | Bloebaum |
| 2002/0082774 A1 | 6/2002 | Bloeblaum |
| 2002/0107030 A1 | 8/2002 | Syrjarinne |
| 2002/0115436 A1 | 8/2002 | Howell |
| 2002/0186165 A1 | 12/2002 | Eschenbach |
| 2003/0112176 A1 | 6/2003 | Vayanos |
| 2003/0038719 A1 | 8/2003 | Fuchs |
| 2003/0154025 A1 | 8/2003 | Fuchs |
| 2005/0062643 A1 | 3/2005 | Pande |
| 2005/0162306 A1 | 7/2005 | Babitch |
| 2005/0186968 A1 | 8/2005 | Durst |
| 2005/0227709 A1 | 10/2005 | Chang |
| 2007/0063875 A1 | 3/2007 | Hoffberg |
| 2008/0005275 A1 | 1/2008 | Overton |
| 2008/0055154 A1 | 3/2008 | Marucci |
| 2008/0147324 A1 | 6/2008 | Garin |
| 2008/0167049 A1 | 7/2008 | Karr |

FOREIGN PATENT DOCUMENTS

| | | |
|---|---|---|
| EP | 1093094 | 4/2001 |
| EP | 1102510 | 5/2001 |
| GB | 2115195 | 9/1983 |
| GB | 2335554 | 3/1998 |
| JP | 58-105632 | 6/1983 |
| JP | 4-326079 | 11/1992 |
| JP | 6-036190 | 5/1994 |
| JP | 7-36035 | 2/1995 |
| JP | 08-065205 | 3/1996 |
| JP | 2000-102058 | 4/2000 |
| WO | WO 90/11652 | 4/1990 |
| WO | WO 97-40398 | 10/1997 |
| WO | WO 99/47943 | 9/1999 |
| WO | WO 00/10028 | 2/2000 |
| WO | WO 00/10031 | 2/2000 |
| WO | WO 00-19644 | 6/2000 |
| WO | WO 00-45191 | 8/2000 |
| WO | WO 01-62034 | 8/2001 |
| WO | WO 02/04975 | 1/2002 |
| WO | WO 02/15612 | 2/2002 |

OTHER PUBLICATIONS

Coenen et al., Novel Fast GPS/GLONASS Code Acquisitions Technique Using Low Update Rate FFT, Electronic Letters, Vo. 28, No. 9, pp. 863–865 (1992).

Marketing Material: Qualcomm CDMA Technologies—Integrated Solutions—MGP6200™ Multimode GPS Processor (8 Pages).

Marketing Material: uNav Microelectronics, uN9x18 Low Power, High Performance GPS Receiver Chipset (2 Pages).

Marketing Material: Global Locate—Hammerhead II™, Single Chip AGPS Solution (2 Pages).

Marketing Material/Press Release: Broadcom Introduces Advanced Single–Chip GPS Solution for Mobile Applications (3 Pages).

Marketing Material/White Paper: SnapTrack: A Qualcomm Company—SnapTrack's Wireless Assisted GPS™ (A–GPS) Solution Provides the Industry's Best Location System—Location Technologies for GSM, GPRS and WCDMA Networks (Qualcomm CDMA Technologies: Enabling the Future of Communications) (4 Pages).

Soilman et al., gps One: A Hybrid Position Location System, 2000, IEEE, pp. 334–335.

Zarlink Semiconductor, "GP2021 GPS 12 Channel Correlator," Apr. 2001, pp. 1–63.

Mattos, P.G., "WAAS/EGNOS–Ready 2–Chip GPS Chipset," 5th International Conference on Satellite Systems for Mobile Communications and Navigation, May 1996, pp. 24–27.

Kibe, Dr. S. V. et al., "Software–based GIC/GNSS Compatible GPS Receiver Architecture Using TMS320C30 DSP Processor" IEEE Satellite Systems for Mobile Communications and Navigation. May 1996.

Trimble Web Page, www.trimble.com/firstgps.html, printed from Trimble Web Site on Sep. 23, 2002, 1 Page.

Trimble's FirstGPS Architecture: A Better Way to Add Location to Your Product, Brochure from Trimble's Web site on Sep. 23, 2002, 4 Pages.

Infenon Web page, www.infenon.com, First GPS Solution, Printed from infenon web site on Sep. 23, 2002, 1 Page.

Ashu Pande, Greg Turetzky, Lionel J Garin, Steve Chang, SiRF Technology Inc. "Wireless–Enabled GPS Products" Wireless Design & Development, Copyright 2000.

L.J. Garin, M. Chansarkar, S. Miocinovic, C. Norman, D. Hilgenberg, SiRF Technology Inc. "Wireless Assisted GPS–SiRF Architecture and Field Test Results" ION GPS '99, Sep. 14–17, 1999, Nashville, TN, p. 489–497.

Greg Turetzky, Leon Peng, Robert Tso, and Jerry Knight, SiRF Technology Inc. "Catching the Wave: SiRF's New Architecture Tackles GPS for Consumer Products" ION GPS '99, Sep. 14–17, 1999, Nashville, TN, p. 771–775.

J. Knight, R. Tso, Dr. L. Peng, A. Pande, G. Turetzky, SiRF Technology Inc. SiRFstar™II Architecture: A Powerful System Platform for Consumer GPS Applications, PowerPoint Presentation Given on Aug. 17, 1999 during the Hot Chips 11 Conference, Stanford University, 14 Pages.

SBN News Staff, "SiRF Technology Unveils Compact GPS Chip Set" printed from http://www.eetimes.com/show/article.jhtml?articleID=10816097, 3 pages.

Junko Yoshida, "Enhanced 911 Service Spurs Integration of GPS into Cell Phones" printed from http://www.eetimes.com/showArticle.jhtml?articleID=18302469,4 Pages.

Business Wire, "SiRF Debuts Revolutionary Architecture and Technologies to Further Frive GPS Into the Mainstream; New SiRFstarII Enables Complete GPS Functionality on Postage–Sized Footprint" Printed from http://findarticles.com/p/articles/mi_m0EIN/is_1999_August_16/ai_55446010/pg_2/?tag=content;coll, 2 Pages.

Wireless Design Online, "SiRF Enhances GPS Chip Set Architecture" Aug. 16, 1999, Edited by Robert Keenan Printed from http://www.wirelessdesign.com.article.mvc/SiRF–Enhances–GPS–Chip–Set_Architecture–0001, 1 Page.

Press Release, SnapTrack, Inc., *SnapTrack Announces Breakthrough Wireless Location Technology:* Multimode Location System™ Provides Dynamic GPS Capability for Wireless Devices (Oct. 26, 1999) ("SnapTrack Press Release").

US 6,519,466 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–20 is confirmed.

New claims 21–54 are added and determined to be patentable.

21. *A geolocation system, comprising:*
*a geolocation server; and*
*a wireless communications device comprising a GPS receiver section, wherein the GPS receiver section can be selectively switched both automatically and manually between a first mode and at least one other mode for determining a geolocation of the wireless communications device, wherein the first mode and the at least one other mode are selected from a group consisting of a standalone mode, an autonomous mode, a network aided mode, and a network centric mode, and the wireless communications device can selectively send the determined geolocation of the wireless communications device to the geolocation server.*

22. *The geolocation system of claim 21, wherein the selective switching occurs in response to a specified performance expectation and wherein the specified performance expectation is a time to first fix.*

23. *The geolocation system of claim 21, wherein the at least one other mode comprises the reverse aiding mode and wherein the reverse aiding mode is a mode in which the wireless communications device provides the geolocation server with absolute time and frequency reference data.*

24. *The geolocation system of claim 21, wherein the at least one other mode comprises the reverse aiding mode and wherein the reverse aiding mode is a mode in which the wireless communications device provides the geolocation server with calibration data which is usable to model a network time offset and frequency drift.*

25. *The geolocation system of claim 21, wherein the at least one other mode comprises the reverse aiding mode and wherein the reverse aiding mode is a mode in which the wireless communications device provides the geolocation server with velocity data associated with movement of the wireless communications device and which is usable to align a Phase Locked Loop (PLL) and to increase an effective wireless cell radius of the wireless communications device within the geolocation system.*

26. *The geolocation system of claim 21, wherein the at least one other mode comprises the reverse aiding mode and wherein the reverse aiding mode is a mode in which the wireless communications device provides the geolocation server with time difference data measured between a network time and a GPS time.*

27. *A method for determining the geoposition of a mobile device, comprising:*
*receiving at least one signal from at least one GPS satellite at the mobile device, wherein the mobile device can be selectively switched into a mode selected from a group comprising a first mode and at least one other mode, wherein the first mode and the at least one other selected mode are selected from a group consisting of a standalone mode, an autonomous mode, a network aided mode, and a network centric mode;*
*enabling the mobile device to be selectively switched from the first mode into the selected mode both automatically and manually;*
*determining the geolocation of the mobile device wherein the geolocation is determined using the selected mode, and wherein the determination of the geolocation occurs within a predetermined time period from the switching of the mobile device into the selected mode; and*
*selectively sending the determined geolocation of the mobile device to a geolocation server via a wireless network.*

28. *The method recited in claim 27, wherein the selective sending of the determined geolocation includes providing a user of the mobile device a user selectable option for either accepting that the determined geolocation be sent to the geolocation server or, alternatively, that the determined geolocation be locked in the wireless communications device.*

29. *The method recited in claim 27, wherein the mobile device receives position data through a network connection as assistance in determining the geolocation of the mobile device when the mobile device is in the network aided mode and wherein the method further includes:*
*providing a user of the mobile device an option of preventing the network connection and to thereby prevent the mobile device from receiving the assistance in determining the geolocation of the mobile device through the network connection.*

30. *The method recited in claim 29, wherein the method further includes the mobile device determining that the assistance is necessary to satisfy user specified requirements.*

31. *The method recited in claim 27, wherein the first mode is an automatically selected mode and the at least one other mode is a manually selected mode and wherein the method includes switching between the first mode and the at least one other mode by at least overriding the automatically selected mode and switching into the manually selected mode.*

32. *The method recited in claim 27, wherein the method further includes operating in a reverse aiding mode.*

33. *The method recited in claim 32, wherein the method further includes the mobile device, while operating in the reverse aiding mode, sending absolute time and frequency reference data to the geolocation server.*

34. *The method recited in claim 32, wherein the method further includes the mobile device while operating in the reverse aiding mode, sending calibration data to the geolocation server and which is used, at least in part, to model a network time offset and frequency drift.*

35. *The method recited in claim 32, wherein the method further includes the mobile device, while operating in the reverse aiding mode, sending velocity data associated with movement of the mobile device to the geolocation server and which is used, at least in part, to align a Phase Locked Loop (PLL) associated with the mobile device and to increase an effective wireless cell radius of the mobile device.*

36. *The method recited in claim 32, wherein the method further includes:*
*the mobile device obtaining absolute time information;*
*the mobile device obtaining time difference data by measuring a difference between a network time and a GPS time; and* the mobile device switching into the reverse aiding mode and sending the time difference data device to the geolocation server.

37. The method recited in claim 36, wherein the time difference data is sent to a different mobile device and used by the different mobile device in acquiring a geolocation.

38. The method recited in claim 27, wherein the method includes the mobile device selectively switching between the standalone mode and the at least one other mode in response to a predetermined event.

39. The method recited in claim 38, wherein the predetermined event comprises a particular bandwidth in the wireless communications network.

40. The method recited in claim 38, wherein the predetermined event comprises a signal strength.

41. The method recited in claim 38, wherein the predetermined event comprises a requested service.

42. The method recited in claim 38, wherein the predetermined event comprises an operator intervention.

43. The method recited in claim 38, wherein the predetermined event comprises an identified performance expectation corresponding to a TTFF (time to first fix) of less than 30 seconds.

44. A wireless communications device, comprising:
a call processing section for communicating with a wireless communications network; and
a GPS receiver section, wherein the GPS receiver section can be selectively switched both automatically and manually between a first mode and at least one other mode for determining a geolocation of the wireless communications device, wherein the first mode and the at least one other mode are selected from a group consisting of a standalone mode, an autonomous mode, and a network aided mode, and wherein the selective switching occurs within a predetermined time period from the determination of the geolocation of the wireless communications device, and the wireless communications device can selectively send the determined geolocation of the wireless communications device to the call processing section for transmission over the wireless communications network.

45. The wireless communications device recited in claim 44, wherein the first mode is an automatically selected mode and the at least one other mode is a manually selected mode and wherein the switching between the first mode and the at least one other mode includes overriding the automatically selected mode and switching into the manually selected mode.

46. The wireless communication device recited in claim 45, wherein the at least one other mode comprises the standalone mode.

47. The wireless communication device recited in claim 45, wherein the automatically selected mode comprises the standalone mode.

48. A geolocation system, comprising:
a geolocation server; and
a wireless communications device comprising a GPS receiver section, wherein the GPS receiver section can be selectively switched between a first mode and at least one other mode for determining a geolocation of the wireless communications device, wherein the first mode and the at least one other mode are selected from a group consisting of a standalone mode, an autonomous mode, a network aided mode, a network centric mode and a reverse aiding mode, and the wireless communications device can selectively send the determined geolocation of the wireless communications device to the geolocation server, the wireless communications device enabling both automatic and manual control over the selective sending of the determined geolocation to the geolocation server.

49. The geolocation system of claim 48, wherein the wireless communications device is configured for switching the GPS receiver section between the first mode and at least one other mode both automatically and manually.

50. A method for determining the geoposition of a mobile device, comprising:
receiving at least one signal from at least one GPS satellite at the mobile device, wherein the mobile device can be selectively switched into a mode selected from a group comprising a first mode and at least one other mode, wherein the first mode and the at least one other selected mode are selected from a group consisting of a standalone mode, an autonomous mode, a network aided mode, and a network centric mode;
determining the geolocation of the mobile device wherein the geolocation is determined using the selected mode, and wherein the determination of the geolocation occurs within a predetermined time period from the switching of the mobile device into the selected mode; and
selectively sending the determined geolocation of the mobile device to a geolocation server via a wireless network, wherein the selective sending of the determined geolocation is both automatically and manually controllable.

51. The method of claim 50, wherein the method further includes enabling the mobile device to be selectively switched from the first mode into the selected mode both automatically and manually.

52. A wireless communications device, comprising:
a call processing section for communicating with a wireless communications network; and
a GPS receiver section, wherein the GPS receiver section can be selectively switched between a first mode and at least one other mode for determining a geolocation of the wireless communications device, wherein the first mode and the at least one other mode are selected from a group consisting of a standalone mode, an autonomous mode, and a network aided mode, and wherein the selective switching occurs within a predetermined time period from the determination of the geolocation of the wireless communications device, and the wireless communications device can selectively send the determined geolocation of the wireless communications device to the call processing section for transmission over the wireless communications network, the wireless communications device enabling both automatic and manual control over the selective sending of the determined geolocation to the geolocation server.

53. The wireless communications device of claim 52, wherein the wireless communications device is configured for switching the GPS receiver section between the first mode and at least one other mode both automatically and manually.

54. The wireless communications device of claim 52, wherein the manual control includes a user selectable option for accepting that the determined geolocation be sent to the geolocation server or, alternatively, locked in the wireless communications device.

* * * * *